(12) United States Patent
Gundavelli et al.

(10) Patent No.: US 11,882,611 B2
(45) Date of Patent: Jan. 23, 2024

(54) DUAL-CONNECTIVITY SUPPORT FOR USER EQUIPMENT IN A HYBRID CELL VIRTUALIZED RADIO ACCESS NETWORK ARCHITECTURE

(71) Applicant: Cisco Technology, Inc., San Jose, CA (US)

(72) Inventors: Srinath Gundavelli, San Jose, CA (US); Indermeet Singh Gandhi, San Jose, CA (US); Arun G. Khanna, Sunnyvale, CA (US); Mark Grayson, Maidenhead (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/321,929

(22) Filed: May 17, 2021

(65) Prior Publication Data

US 2022/0369404 A1 Nov. 17, 2022

(51) Int. Cl.
*H04W 76/16* (2018.01)
*H04W 40/20* (2009.01)

(52) U.S. Cl.
CPC ........... *H04W 76/16* (2018.02); *H04W 40/20* (2013.01)

(58) Field of Classification Search
CPC .............................. H04W 76/16; H04W 40/20
See application file for complete search history.

(56) References Cited

U.S. PATENT DOCUMENTS

| 2013/0003695 A1 | 1/2013 | Nylander et al. |
| 2013/0235785 A1 | 9/2013 | Sebire et al. |
| 2013/0237225 A1 | 9/2013 | Martin |
| 2015/0016299 A1 | 1/2015 | Zhang et al. |

(Continued)

FOREIGN PATENT DOCUMENTS

| CN | 108235339 A | 6/2018 |
| CN | 111918297 A | 11/2020 |

(Continued)

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 16)," 3GPP TS 36.413 V16.4.0 (Jan. 2021), Technical Specification, Jan. 2021, 423 pages.

(Continued)

*Primary Examiner* — Shukri Taha
(74) *Attorney, Agent, or Firm* — Edell, Shapiro & Finnan, LLC

(57) ABSTRACT

Presented herein are techniques to facilitate dual-connectivity support for a user equipment (UE) in a hybrid cell virtualized Radio Access Network (vRAN) architecture. In one example, a method may include obtaining, by a node of a mobile network via a first cell of a RAN, a request for a UE to connect to the mobile network via the first cell in which the RAN includes at least one shared cell and at least one unique cell; determining that the UE is allowed for dual-connectivity operation; and providing a policy to the UE, wherein the policy identifies, for each of one or more (Continued)

applications, one of a shared cell operating mode or a unique cell operating mode that the UE is to utilize for each of the one or more applications.

20 Claims, 10 Drawing Sheets

(56) References Cited

U.S. PATENT DOCUMENTS

| | | | |
|---|---|---|---|
| 2015/0271683 A1* | 9/2015 | Yan | H04W 48/20 370/329 |
| 2015/0296449 A1* | 10/2015 | Shu | H04W 48/18 455/435.3 |
| 2016/0037550 A1 | 2/2016 | Barabell et al. | |
| 2017/0105112 A1 | 4/2017 | Park et al. | |
| 2019/0141586 A1 | 5/2019 | Olsson et al. | |
| 2019/0223055 A1 | 7/2019 | Bor Yaliniz et al. | |
| 2020/0029338 A1 | 1/2020 | Lee et al. | |
| 2020/0045583 A1* | 2/2020 | Kim | H04W 76/15 |
| 2020/0053005 A1 | 2/2020 | Balasubramanian et al. | |
| 2020/0053622 A1 | 2/2020 | Huang-Fu et al. | |
| 2020/0092758 A1 | 3/2020 | Youn et al. | |
| 2020/0127785 A1 | 4/2020 | Blankenship et al. | |
| 2020/0128432 A1 | 4/2020 | Youn et al. | |
| 2020/0154350 A1 | 5/2020 | Dao et al. | |
| 2020/0187085 A1 | 6/2020 | Jagannatha et al. | |
| 2020/0204252 A1 | 6/2020 | Barbieri et al. | |
| 2020/0275348 A1 | 8/2020 | Park et al. | |
| 2020/0314950 A1 | 10/2020 | Dao et al. | |
| 2020/0351702 A1 | 11/2020 | Stojanovski et al. | |
| 2020/0383009 A1 | 12/2020 | Qiao et al. | |
| 2020/0389835 A1* | 12/2020 | Talebi Fard | H04W 8/186 |
| 2020/0412438 A1 | 12/2020 | Yang et al. | |
| 2021/0022024 A1 | 1/2021 | Yao et al. | |
| 2021/0051545 A1 | 2/2021 | Luo et al. | |
| 2021/0243839 A1* | 8/2021 | Krishnaswamy | H04W 24/04 |
| 2022/0078631 A1 | 3/2022 | Salahuddeen et al. | |
| 2022/0264415 A1 | 8/2022 | Khirallah et al. | |
| 2022/0369163 A1 | 11/2022 | Gundavelli et al. | |
| 2022/0369324 A1 | 11/2022 | Gundavelli et al. | |
| 2022/0377507 A1 | 11/2022 | Xie et al. | |

FOREIGN PATENT DOCUMENTS

| | | |
|---|---|---|
| EP | 2757844 A1 | 7/2014 |
| WO | 2014163570 A1 | 10/2014 |
| WO | 2017/173259 A1 | 10/2017 |
| WO | 2020/100053 A1 | 5/2020 |
| WO | 2021069067 A1 | 4/2021 |
| WO | 2021071397 A1 | 4/2021 |

OTHER PUBLICATIONS

3GPP, "3rd Generation Partnership Project; Technical Specification Group Radio Access Network; NR; Radio Resource Control (RRC) protocol specification (Release 16)," 3GPP TS 38.331 V16.4.1 (Mar. 2021), Technical Specification, Mar. 2021, 949 pages.
3GPP, "3rd Generation Partnership Project; Technical Specification Group Radio Access Network; NG-RAN; Xn application protocol (XnAP) (Release 16)," 3GPP TS 38.423 V16.4.0 (Jan. 2021), Technical Specification, Jan. 2021, 457 pages.
3GPP, "3rd Generation Partnership Project; Technical Specification Group Radio Access Network; NG-RAN; F1 application protocol (F1AP) (Release 16)," 3GPP TS 38.473 V16.5.0 (Apr. 2021), Technical Specification, Apr. 2021, 463 pages.
Sharetechnote, "5G/NR—Beam Management," https://www.sharetechnote.com/html/5G/5G_Phy_BeamManagement.html, retrieved Apr. 26, 2021, 14 pages.
Patel, et al., "5G meets Time Sensitive Networking," https://www.ericsson.com/en/blog/2018/12/5g-meets-time-sensitive-networking, Dec. 18, 2018, 7 pages.
O-RAN Alliance, "O-RAN Fronthaul Control, User and Synchronization Plane Specification 5.0," O-RAN.WG4.CUS.0-v05.00, Technical Specification, Nov. 2020, 291 pages.
Metaswitch, "What is 5G beamforming, beam steering and beam switching with massive MIMO," https://www.metaswitch.com/knowledge-center/reference/what-is-beamforming-beam-steering-and-beam-switching-with-massive-mimo, retrieved Apr. 26, 2021, 6 pages.
Cisco, "Operator Specific QCI," MME Administration Guide, StarOS Release 21.20, https://www.cisco.com/c/en/us/td/docs/wireless/asr_5000/21-20_6-14/MME-Admin/21-20-mme-admin/21-17-MME-Admin_chapter_01000001.html, Jul. 2020, 6 pages.
3GPP, "3rd Generation Partnership Project; Technical Specification Group Core Network and Terminals; Non-Access-Stratum (NAS) protocol for 5G System (5GS); Stage 3; (Release 17)," 3GPP TS 24.501 V17.2.1 (Apr. 2021), Technical Specification, Apr. 2021, 758 pages.
3GPP, "3rd Generation Partnership Project; Technical Specification Group Services and System Aspects; System architecture for the 5G System (5GS); Stage 2 (Release 17)," 3GPP TS 23.501 V17.0.0 (Mar. 2021), Technical Specification, Mar. 2021, 489 pages.
Wikipedia, "Cell Global Identity," https://en.wikipedia.org/wiki/Cell_Global_Identity, Jan. 2020, 3 pages.
3GPP, "3rd Generation Partnership Project; Technical Specification Group Radio Access Network; NR; Radio Resource Control (RRC) protocol specification (Release 16)," 3GPP TS 38.331 V16.3.1 (Jan. 2021), Technical Specification, Jan. 2021, 932 pages.
3GPP, "3rd Generation Partnership Project; Technical Specification Group Radio Access Network; NR; NR and NG-RAN Overall Description; Stage 2 (Release 16)," 3GPP TS 38.300 V16.5.0 (Mar. 2021), Technical Specification, Mar. 2021, 151 pages.
Techplayon, "5G NR Physical Cell ID (PCI) Planning," https://www.techplayon.com/5g-nr-physical-cell-id-pci-planning/, Nov. 2019, 4 pages.
3GPP, "3rd Generation Partnership Project; Technical Specification Group Services and System Aspects; Security architecture and procedures for 5G system (Release 17)," 3GPP TS 33.501 V17.1.0 (Mar. 2021), Technical Specification, Mar. 2021, 256 pages.
3GPP, "3rd Generation Partnership Project; Technical Specification Group Services and System Aspects; Policy and charging control framework for the 5G System (5GS); Stage 2 (Release 17)," 3GPP TS 23.503 V17.0.0 (Mar. 2021), Technical Specification, Mar. 2021, 128 pages.
Derham, et al., "3GPP WLAN integration in 5G System—Release 17," IEEE 802.11-19/1215r0, https://mentor.ieee.org/802.11/dcn/19/11-19-1215-00-AANI-3gpp-wlan-integration-in-5g-system-rel-17.pptx, Jul. 2019, 11 pages.
3GPP, "3rd Generation Partnership Project; Technical Specification Group Radio Access Network; Evolved Universal Terrestrial Radio Access (E-UTRA) and NR; Multi-connectivity; Stage 2 (Release 16)," 3GPP TS 37.340 V16.5.0 (Mar. 2021), Technical Specification, Mar. 2021, 84 pages.
O-RAN Alliance, "O-RAN Fronthaul Working Group Control, User and Synchronization Plane Specification 3.0," O-RAN.WG4.CUS.0-v03.00, Technical Specification, Mar. 2020, 253 pages.

* cited by examiner

DUAL-CONNECTIVITY SUPPORT FOR USER EQUIPMENT IN A HYBRID CELL VIRTUALIZED RADIO ACCESS NETWORK ARCHITECTURE

TECHNICAL FIELD

The present disclosure relates to network equipment and services.

BACKGROUND

Networking architectures have grown increasingly complex in communications environments, particularly mobile networking environments. In particular, virtualized Radio Access Network (vRAN) architectures have been developed to provide radio coverage for mobile networks. However, there are significant challenges in managing radio access for vRAN architectures in order to provide services for user equipment.

DESCRIPTION OF EXAMPLE EMBODIMENTS

Overview

Figure 1:
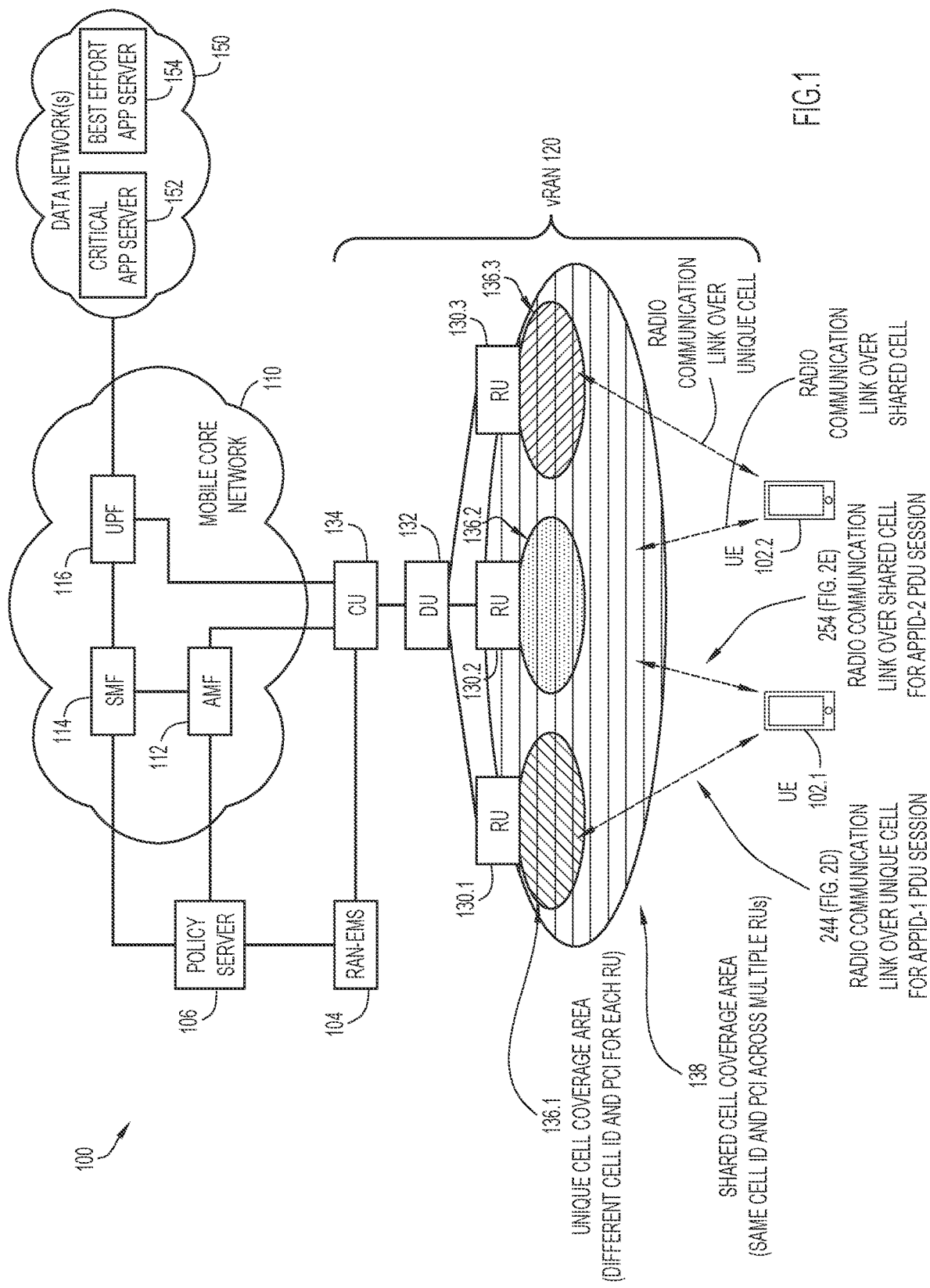
FIG. 1 is a diagram of a system in which techniques may be implemented to provide dual-connectivity (DC) support for user equipment (UE) in a hybrid cell virtualized Radio Access Network (vRAN) architecture, according to an example embodiment.

Techniques presented herein may facilitate dual-connectivity (DC) support for one or more user equipment (UE) in a hybrid cell virtualized Radio Access Network (vRAN) architecture. In particular, techniques herein may facilitate dual protocol data unit (PDU) sessions across different cell operating modes or types, such as a unique cell type and a shared cell type, in the hybrid cell vRAN architecture. The selection of a cell type (unique or shared) for a PDU session of a UE can be based on a policy, such as a UE Route Selection Policy (URSP) configured for the UE that specifies the operating mode/cell type that is to be utilized to establish a PDU session for each of one or more applications. In various instances, applications can be identified in the policy based on application identifiers (IDs), application types, and/or the like.

In one embodiment, a method is provided that may include obtaining, by a node of a mobile network via a first cell of a radio access network, a request for a user equipment to connect to the mobile network via the first cell, wherein the radio access network comprises a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units; determining that the user equipment is allowed for dual-connectivity operation; and providing a policy (e.g., an enhanced URSP) to the user equipment, wherein the policy identifies, for each of one or more applications, one of a shared cell operating mode or a unique cell operating mode that the user equipment is to utilize for each of the one or more applications. In one instance, the method may include obtaining the policy for the user equipment from a policy server.

Example Embodiments

As referred to herein, an 'enterprise' or 'enterprise entity' may be considered to be a business, government, educational institution, an organization, and/or the like that may include multiple enterprise locations (or sites), such as a main campus, remote branches, any operating environment of private 5G (e.g., factory floor, port, mining facility, electric grid, etc.) and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi® access points, etc.). Stated differently, the WWA RAN coverage area provided by a WWA radio node is typically larger (sometimes orders of magnitude larger for example, up to a ratio of 1:5, depending on spectrum and power regulations) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) or a Public Network Integrated Non-Public Network (PNI-NPN) in some instances in some instances. Cisco is a registered trademark of Cisco Technology, Inc.

Discussed herein are features associated with vRAN architectures that may be provided for different radio accesses. In some instances, a vRAN architecture can be implemented as a disaggregated vRAN architecture that includes the split of a base station, such as a gNB, into a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component. In some instances, such as for shared cell vRAN architectures as discussed in further detail herein, multiple DUs (each interfacing with corresponding RU(s)) can interface with a CU-CP component and a CU-UP component.

Referring to FIG. 1, FIG. 1 is a block diagram of a system 100 in which techniques may be implemented to provide dual-connectivity (DC) support for user equipment (UE) in a hybrid cell virtualized Radio Access Network (vRAN) architecture, according to an example embodiment.

System 100 includes a number of UEs 102, such as a first UE 102.1 (referred to herein generally as UE 102.1) and a second UE 102.2 (referred to herein generally as UE 102.2), a RAN Element Management System (RAN-EMS) 104, a policy server 106, a mobile core network 110, and a vRAN 120, which may be inclusive of a disaggregated vRAN 120. In at least one embodiment, mobile core network 110 may be representative of a 5G core network (5GC) including an Access and Mobility Management Function (AMF) 112, a Session Management Function (SMF) 114, and a User Plane Function (UPF) 116. Although not illustrated, mobile core network 110 may also include any combination of 4G/nG network elements. Although not illustrated, mobile core network 110 may also include any combination of 4G/nG network elements.

The vRAN 120 may include a number of radio units (RUs) 130, including a first RU 130.1 (also referred to herein as RU 130.1), a second RU 130.2 (also referred to herein as RU 130.2), and a third RU 130.3 (also referred to herein as RU 130.3). Each RU 130.1, 130.2, and 130.3 may interface with a distributed unit (DU) component 132 (also referred to herein as DU 132), which may further interface with a central (or centralized) unit (CU) component 134 (also referred to herein as CU 134). The interface/interconnection between each RU 130.1, 130.2, and 130.3 and DU 132 is typically referred to as a fronthaul network. The interface/interconnection between DU 132 and CU 134 can be referred to as a midhaul network.

One or more data network(s) 150 are also shown in FIG. 1, which may include a critical application (app) server 152 and a best effort application (app) server 154. In general, critical app server 152 may facilitate functionality for business-critical/business-related applications such as a factory management application, a business collaboration tool, etc. that may be operated by UE 102.1 and/or UE 102.2. In general, best effort app server 154 may facilitate functionality for non-business-critical/non-business-related applications, such as a streaming music application, streaming video application, etc. that may be operated by UE 102.1 and/or UE 102.2.

As illustrated in FIG. 1, CU 134 can further interface with RAN-EMS 104, AMF 112, and UPF 116. AMF 112 can further interface with policy server 106 and SMF 114, which may further interface with UPF 116. UPF 116 may also interface with data network(s) 150. SMF 114 may also interface with policy server 106. The interface/interconnection between CU 134 and elements of the mobile core network 110 is typically referred to as a backhaul network.

An RU, such as any of RUs 130.1-130.3, may implement any combination of a WWA (e.g., cellular) and/or WLA (e.g., Wi-Fi®) air interface for any combination of Radio Access Technology (RAT) types (sometimes referred to more generally as 'accesses') for vRAN 120 such as, but not limited to: 3GPP licensed spectrum accesses (e.g., 3rd Generation (3G), 4G/LTE, 5G, and/or next Generation (nG)/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as any of UEs 102, may utilize to connect to one or more RUs for one or more sessions (e.g., voice, video, data, gaming, combinations thereof, etc.). More generally, an RU may perform lower Physical (PHY) layer and RF operations to facilitate RF connections with one or more UE. The coverage area of a radio node such as an eNB, gNB, RU, etc. is typically referred to as a 'cell' in which one or more UE may attach to the radio node that serves the coverage area/cell such that service connection to a network may be facilitated via the cell provided by the radio node.

A DU (also sometimes referred to as a baseband unit), such as DU 132, may provide lower level operations of the radio signal processing stack, such as Radio Link Control (RLC), Medium Access Control (MAC), and higher PHY layer operations, such as digital processing, including signal modulation and demodulation, channel encoding and decoding, and scheduling, among others. A CU, such as CU 134, may provide upper level operations of a radio signal processing stack, such as user plane Packet Data Convergence Protocol (PDCP) functions and user plane Service Data Adaptation Protocol (SDAP), among others. The split of operations of a radio signal processing stack among between a DU a CU can be varied depending on implementation and/or configuration of a given vRAN/network architecture. A CU, such as CU 134, can also operate to DU(s), such as DU 132, for a vRAN architecture via Resource Control (RRC) functions and the control plane part of the PDCP protocol. In some embodiments, CU 134 may be further disaggregated into a CU-CP component and a CU-UP component.

In addition to radio signal processing operations, CU 134, DU 132, and RUs 130.1-130.3 may perform additional operations as discussed for various embodiments herein.

A UE, such as any of UEs 102.1 and 102.2, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections with one or more access networks. As referred to herein, the terms 'UE' and 'UE device' can be used interchangeably.

In accordance with embodiments herein, one or both of UE 102.1 and/or UE 102.2 may be a dual-connectivity (DC) capable UE such that the UE may be capable of two concurrent connections to a same RAT type (e.g., 5G/NR) via a primary connection and a secondary connection. In some embodiments during connection establishment of a UE for a given cell, the UE may indicate whether it is or is not DC capable. Subscription and/or policy information maintained for a UE within system 100 may identify whether the UE is allowed or is not allowed for DC operation within system 100 (e.g., the policy may indicate mode: DCNR to indicate that the UE is allowed for DC operation within the system 100 for 5G/NR).

In addition to various operations discussed for techniques herein, an AMF, such as AMF 112, may facilitate access and mobility management control/services for one or more UE, such as UEs 102, to facilitate one or more over-the-air (OTA) RF connection(s) between the UE 102 and the vRAN 120. In addition to various operations discussed for techniques herein, an SMF, such as SMF 114, may be responsible for UE Protocol Data Unit (PDU) session management (SM), with individual functions/services being supported on a per-session basis in order to facilitate data transfer(s) between a UE and one or more data network(s). Generally, a UPF, such as UPF 116, may operate as a Virtual or Virtualized Network Function (VNF) to provide packet routing and forwarding operations for user data traffic and may also perform a variety of functions such as packet inspection, traffic optimization, Quality of Service (QoS), policy enforcement and user data traffic handling (e.g., to/from data network(s) 150), and billing operations (e.g., accounting, etc.) for UE 102 PDU sessions.

It is to be understood that other network elements may be configured for mobile core network 110 for any combination of 3G/4G/5G/nG implementations, such as, a Policy Control Function (PCF), a Policy and Charging Rules Function (PCRF), a Network Slice Selection Function (NSSF), a Network Repository Function (NRF), a Unified Data Management (UDM) service, a Unified Data Repository (UDR), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications.

In various embodiments, the data network(s) 150 of FIG. 1 may be any combination of the Internet, an Internet Protocol (IP) Multimedia Subsystem (IMS), Ethernet network, Ethernet switching system(s), and/or the like.

Generally, RAN-EMS 104 may operate to configure, update, and/or otherwise manage resources for vRAN 120 via CU 134, DU 132, and RUs 130.1, 130.2, and 130.3 and policy server 106 may provide for maintaining/storing one or more policies for vRAN 120 and/or UEs 102 in accordance with embodiments described herein. Although illustrated as separate elements for the embodiment of FIG. 1, in some instances, RAN-EMS 104 and policy server 106 may be implemented as a combined element. For example, in some instances, RAN-EMS 104 and policy server 106 may be implemented as any combination of a Cisco® Digital Network Architecture Center (DNA-C), a Cisco® RAN Element Management System (RAN-EMS) an enterprise domain controller, including Meraki® cloud, and/or the like. Meraki® is a registered trademark of Meraki, LLC, a wholly owned subsidiary of Cisco Systems, Inc. In various embodiments, policy server 106 may be any combination of an Authentication, Authorization, and Accounting (AAA) function/server, a PCF/PCRF, a HSS, a UDR/UDM, and/or the like. In some instances, policy server 106 may be implemented as a Cisco Identity Services Engine (ISE), which may support any combination of Remote Authentication Dial-In User Service (RADIUS) and/or Diameter protocols.

A RAN, such as vRAN 120, can be configured to operate in two modes: a) unique cell configuration/operating mode, and b) shared cell configuration/operating mode. Generally, the unique cell mode is the most widely used configuration/operating mode where in which each RU operates as a unique cell with a unique cell identifier. Current public cellular networks often operate in the unique cell mode.

The shared cell mode is a special configuration/operating mode in which multiple RUs that are part of a shared cell form to become one giant cell, sometimes referred to as a 'super cell'. In this configuration mode, all the RUs that are part of this giant cell share the same cell identifiers and operate in the same frequency bands. As referred to herein, shared cells and unique cells can be referred to as cell types.

The identifiers that provide a unique identity to a cell, whether configured as unique cell or a shared cell, are Physical Cell Identifier (PCI) and Cell Global Identity (CGI). The term 'PCI' is typically used in reference to 4G/LTE implementations, whereas the term 'New Radio PCI' (NR-PCI) is typically used in reference to 5G-New Radio (5G-NR) implementations. Further, CGI for 4G/LTE implementations is referred to as Evolved Universal Mobile Telecommunications System (UMTS) Terrestrial Radio Access Network (E-UTRAN) CGI (E-CGI) and CGI for 5G-NR is referred to as NR-CGI.

A shared cell configuration has many advantages. For example, all RUs that are part of shared cell can all serve a given UE at any given point of time. A transmitted frame from a given UE will be received by all of the RUs in their RF reachability range. The implication of this is that the UE is not required to perform handovers as it moves from one RF connection with one RU to an RF connection with another RU within the same shared cell, meaning there are no handovers within the same shared cell. In particular, handover involves the careful co-ordination and configuration of parameters in neighboring cells, including the optimization of hysteresis levels that control the triggering of the handover procedure. In contrast, by operating with a shared cell configuration, no optimization of such parameters is involved. The shared cell mode also eliminates any cell border interference issues, as all the RUs are operating in the same frequency bands. Additionally, the shared cell operating mode offers improved reliability over the unique cell operating mode, as there may be more than one RU receiving a frame transmitted by a given UE operating in the shared cell operating mode.

The shared cell configuration/operating mode can be very useful in industrial applications, such as factory floor applications in which one or more business-critical or business-related application(s) are to be utilized by a UE. For example, in one instance, an Ultra-Reliable and Low-Latency Communication (URLLC) type or level of service may be utilized by a UE. Other examples of critical/business-related application may include enterprise collaboration tools (e.g., video conferencing tools, email tools, industrial applications, and/or the like). The shared cell configuration mode, with its inherent spatial diversity properties is well suited for such sensitive applications.

However, the shared cell configuration also incurs a cost; the capacity of the shared cell (encompassing multiple RUs) reduces to the size of a single cell (with one RU). For example, if each RU for a deployment operating in a unique cell mode can support 'n' UE connections, the capacity of the vRAN with 'm' radio units is 'n multiplied by m'. However, for RUs operating in a shared cell mode, the capacity of the shared cell is still 'n' UE connections.

In accordance with techniques discussed herein, system 100 may provide for a new mode, referred to as a 'hybrid cell configuration mode' or, more broadly, a 'hybrid cell', for use in enterprise private 5G/nG deployments via vRAN 120. In particular, a new hybrid cell approach is provided in which an RU/cell can be operated in both shared cell and unique cell configuration/operating modes concurrently.

Accordingly, vRAN 120 may be configured to provide 3GPP private 4G/LTE, 5G/nG, and/or CBRS mobile network services via CU 134, DU 132, and respective RUs 130.1, 130.2, and 130.3 through respective unique cell coverage areas 136.1 (provided by RU 130.1 in at least one embodiment), 136.2 (provided by RU 130.2 in at least one embodiment), and 136.3 (provided by RU 130.3 in at least one embodiment) and a shared cell coverage area 138 (provided by all of RUs 130.1, 130.2, and 130.3 in at least one embodiment). As referred to herein, the terms 'cell coverage area' and 'cell' may be referred to interchangeably. For example, the terms unique cell coverage area 136.1 and unique cell 136.1 may be used interchangeably, the terms unique cell coverage area 136.2 and unique cell 136.2 may be used interchangeably, the terms unique cell coverage area 136.3 and unique cell 136.3 may be used interchangeably, and the terms shared cell coverage area 138 and shared cell 138 may be used interchangeably.

Each respective unique cell coverage area 136.1, 136.2, and 136.3 is provided by each respective RU 130.1, 130.2, and 130.3 in which each unique share cell coverage area provided by each respective RU is not shared with the other RUs. As such, each respective RU 130.1, 130.2, and 130.3 broadcasts a different cell identity (ID) (i.e., CGI such as E-CGI/NR-CGI) and PCI/NR-PCI for each respective unique cell coverage area 136.1, 136.2, and 136.3.

In contrast, shared cell coverage area 138 is provided by and shared among all RUs 130.1-130.3. Thus, all RUs 130.1, 130.2, and 130.3 may broadcast a same cell ID (E-CGI/NR-CGI) and PCI/NR-PCI for the shared cell coverage area 138.

Thus, in a hybrid cell deployment, such as shown for the disaggregated vRAN 120 of FIG. 1, RUs 130.1-130.3 can be configured as hybrid cells such that they can act like a single shared cell to serve one or more UEs 102 via shared cell coverage area 138 provided across all the RUs 130.1-130.3 and, further, each respective RU 130.1, 130.2, and 130.3 can also provide each of a respective unique cell coverage area 136.1, 136.2, and 136.3. Thus, each respective RU 130.1, 130.2, and 130.3 broadcasts a different cell identity (ID) (E-CGI/NR-CGI) and PCI/NR-PCI for each respective unique cell coverage area 136.1, 136.2, and 136.3 and all of RUs 130.1, 130.2, and 130.3 may broadcast a same cell ID (E-CGI/NR-CGI) and PCI/NR-PCI for the shared cell coverage area 138 that is also different from each respective unique cell E-CGI/NR-CGI and PCI/NR-PCI. The shared cell and the unique cells may share the same network identity, such as Public Land Mobile Network Identity (PLMN-ID).

As referred to herein, a unique cell may also be referred to interchangeably as a non-shared cell. Thus, the terms 'unique cell operating mode' and 'non-shared cell operating mode' can be used herein interchangeably. As shown in the embodiment of FIG. 1, three unique/non-shared cells and one shared cell are illustrated; however, it is to be understood that the example number of unique/non-shared cells and shared cells and/or the number of RUs forming a shared cell can be varied depending on implementation.

Further, it is to be understood that per-RU shared cells/coverage areas (which may be partially or wholly overlapping, as generally illustrated for unique cell coverage areas 136.1, 136.2, and 136.3), can also overlap the shared cell coverage area 138. In some instances, an RU may support one or multiple shared cells. Further, although illustrated as having no coverage gaps, in some instances RF gaps may be present for the shared cell coverage area 138. In some instances, multiple DUs and CUs may be present within system 100 in which each DU/CU can support one or more RUs also providing hybrid/non-hybrid cells. Thus, multiple shared cells can be present in system 100 in some instances. Further, the size and shape of the cells illustrated in FIG. 1 are provided for illustrative purposes only and are not meant to limit the broad scope of the embodiments discussed herein. Any size/shape of cell can be envisioned within the scope of embodiments discussed herein.

Additionally, although embodiments herein discuss that each RU 130.1, 130.2, and 130.3 operates in a hybrid configuration to provide unique and shared cell coverage areas, it is to be understood that one or more RUs for a vRAN implementation may operate in a non-hybrid mode by providing only unique cell or shared cell coverage. For example, in at least one embodiment, at least two of RUs 130.1, 130.2, and 130.3 may operate in the hybrid mode to provide both shared cell 138 and their corresponding unique cell, whereas the other of the at least two RUs may operate in a non-hybrid mode and may either provide only the shared cell 138 or only a corresponding unique cell.

Further, although UEs 102.1 and 102.2 are illustrated in FIG. 1 as being outside the coverage areas of the cells with which they are/can be connected, such illustration is provided for illustrative purposes only in order to discuss various feature of embodiments herein. It is to be understood that UEs 102.1 and 102.2 are/can be located within coverage areas of the cells with which they are connected as discussed for various embodiments herein.

Given the above characterization of shared and unique cell modes, each with its own set of advantages and disadvantages, one challenge for hybrid implementations may include determining the preferred operating mode (unique cell or shared cell) for one or more applications operated by a DC capable UE for private 5G/nG deployments. For example in some instances, a DC capable UE, such as UE 102.1 and/or UE 102.2, may seek to initiate a session for a business-critical/business-related application that may benefit from shared cell connectivity, such as, but not limited to, a video teleconference application, a factory management application, business collaboration tools (e.g., email, etc.), and/or the like that may operate via critical app server 152 while also initiating a session for a non-business-critical or non-business-related application that may be provided by best effort app server 154 that an enterprise may desire to assign to unique cell connectivity. Non-business-critical/non-business-related applications can include, but not be limited to, streaming music applications, streaming video applications, social media applications, and/or the like. Thus, while utilization of a shared cell may be advantageous for one set of applications, the same configuration may be an in efficient use of network resources for a large set of other applications In accordance with techniques discussed herein, system 100 may provide DC support for DC capable UEs within the hybrid cell architecture of vRAN 120 in order to facilitate at least two PDU session flows for a UE 102 in which each of the PDU session flows can be across a different cell type based on an enterprise policy configured for policy server 106 for each of one or more applications operated by the UE 102 in which the enterprise policy identifies a cell operating mode (shared or unique) that is to be utilized by the UE for each of one or more applications. Thus, the UE 102 can concurrently utilize both a shared cell radio communication link via the shared cell operating mode and a unique cell radio communication link via the unique cell operating mode for different PDU sessions/applications. For example, applications as may be identified using any combination of an application identifier (AppID or AppId), an application name, and/or the like can be mapped or otherwise assigned to a corresponding cell operating mode that is to be utilized for a PDU session initiated by a UE for a given application. An AppID can be any numeric and/or alphanumeric identifier that uniquely identifies a particular application.

In one embodiment, the enterprise policy may be an enhanced UE Route Selection Policy (URSP) that can be configured for policy server 106. Conventionally, a URSP can be used to allow for the selection of a DNN/APN, Single-Network Slice Selection Assistance Information (S-NSSAI), RAT type, Session and Service Continuity (SSC) mode, and/or the like when an application is launched. A URSP can include a Traffic Descriptor portion and a Route Descriptor portion in which a particular Traffic Descriptor (e.g., AppID) can be linked to one or more Route Descriptors (e.g., DNN/APN, S-NSSAI, RAT type, SSC mode, etc.) that are triggered upon identification of the particular Traffic Descriptor (e.g., upon launching an application by a UE. In accordance with embodiments herein, an enhanced URSP can be configured in which the Traffic Descriptors for the enhanced URSP identify each of an application (using an AppID for each application) and the Route Descriptor for each application is enhanced to identify an operating mode (shared cell operating mode or unique cell operating mode) that is to be utilized for a PDU session for each application. Other Route Descriptor information can be configured in an enhanced URSP in accordance with various embodiments herein.

In at least one embodiment, an enhanced URSP can be configured for each of UE 102.1 and 102.2 that may be the same or different URSPs for each UE based on enterprise policy and/or the like. In at least one embodiment, an enhanced URSP can be configured for each of one or more different types, classes, and/or groups of UEs 102.1 and 102.2. In at least one embodiment, different enhanced URSPs can be configured for different network locations (e.g., site specific policies for different branch offices, different factories, different factory floors, etc.). Other enhanced URSP configurations can be envisioned that may utilize any combination of these examples and/or others and, thus, are clearly within the scope of embodiments discussed herein.

TABLE 1, below, illustrates an example enhanced URSP that may configured for policy server 106 for a given UE, according to an example embodiment.

TABLE 1

Example Enhanced URSP

| AppID | Slice Information (Opt) | DNN | RAT Type | Operating Mode |
|---|---|---|---|---|
| AppID-1 | S-NSSAI-1 | DNN(150) | NR | Unique-Cell |
| AppID-2 | S-NSSAI-1 | DNN(150) | NR | Shared-Cell |

As illustrated in TABLE 1, the example enhanced URSP identifies a number of applications (AppIDs, such as AppID-1 and AppID-2), which can be considered Traffic Descriptors for the enhanced URSP. The Route Descriptors for the enhanced URSP for each corresponding Traffic Descriptor (e.g., each AppID) can identify Data Network Name (DNN) information (e.g., identifying data network 150), RAT type information (e.g., identifying 5G/NR), and a cell operating mode (e.g., Unique-Cell or Shared-Cell) to be to be utilized for a PDU session for each of the applications included in the enhanced URSP. In some embodiments, the enhanced URSP can include slice information (e.g., S-NSSAI) identifying a slice that is to be utilized for each application. Although DNN is illustrated in TABLE 1, it is to be understood that Access Point Name (APN) could also be utilized for 4G RAT types (e.g., RAT type=E-UTRAN, etc.).

As shown for the enhanced URSP in TABLE 1, the Traffic Descriptor AppID-1 (which may identify a non-business-critical/non-business-related application operated via best effort app server 154) can be associated with a Route Descriptor indicating a slice identifier S-NSSAI-1, DNN (150), RAT type NR, and the Unique-Cell operating mode indicating that a PDU session for AppID-1 is to be operated via the unique cell operating mode. Also shown for the enhanced URSP in TABLE 1, the Traffic Descriptor AppID-2 (which may identify a business-critical/business-related application) can be associated with a Route Descriptor indicating a slice identifier S-NSSAI-1, DNN(150), RAT type NR, and the Shared-Cell operating mode indicating that a PDU session for AppID-2 is to be operated via the shared cell operating mode.

The enhanced URSP configured for a given UE can be stored in association with any DNN/APN (e.g., for per-DNN/APN level URSPs), any UE/subscriber identifier that can be used to identify a given enhanced URSP for a given UE (e.g., for per-UE level URSPs), such as, for example, any combination of an International Mobile Subscriber Identity (IMSI), International Mobile Equipment Identity (IMEI), Subscription Permanent Identifier (SUPI), Subscription Concealed Identifier (SUCI), any group/class/type identifier that can identify different groups/classes/types of UEs (e.g., for per-group/class/type level URSPs), such as ranges of ranges of IMEIs, ranges of SUPIs, etc., Security or Scalable Group Tag (SGT) identifiers for groups of UEs, device type identifiers (e.g., smartphones, automated guided vehicles (AGV)s, etc.), and/or the like for one or more UE(s).

In one embodiment, an enhanced URSP configured for a given UE can be extended to include an indication of a RAN configuration mode for the UE that indicates whether the given UE is approved/allowed for DC NR operation via vRAN 120 (mode: DCNR) and/or an enterprise policy for the UE stored at policy server 106 can be configured to indicate that a given UE is allowed/approved for DCNR operation (e.g., to concurrently connect over both unique and shared cells for a given deployment).

During operation, a given enhanced URSP configured for a given UE can be communicated to the UE through UE registration with the mobile core network 110 in order to enable the UE to utilize a shared cell operating mode or a unique cell operating mode for establishing a PDU session for a given application as identified in the enhanced URSP.

In one embodiment, one or more beam resource policies can also be configured for policy server 106 such that various beam resources may be utilized for the shared cell 138 and/or the unique cells 136.1, 136.2, and 136.3.

For example, a UE may access broadcast beam resources via the shared cell operating mode and may access single beam resources via the unique cell operating mode. Broadcast beam resources may help to ensure that the most consistent service is obtained across the service area, whereas single beam IDs originating from a single RU/unique cell can help to ensure an optimized use of frequency resources.

Generally, a beamformed system can use a plurality of antenna elements to adapt the composite antenna gain pattern generated by the antenna elements. The system can apply a set of amplitude and phase weights to the signals applied to individual antenna elements to direct the antenna main lobe pattern and/or side lobes and/or nulls towards specific azimuth and/or elevation angles. The use of specific azimuths and/or elevation angles can be used to beneficially direct radiated energy and receive energy to/from locations of specific user devices, in preference to other locations. Opportunistically, then serving a plurality of devices (e.g., UE 102.1 and 102.2), the radiation pattern used to serve independent devices can generate a high degree of orthogonality between the channels used to serve individual devices. This allows multiple devices to be served simultaneously, using spatial multiplexing to simultaneously direct radiated energy towards a first device using a first set of antenna weights and towards a second device using a second set of antenna weights.

The individual channels are sensed using a system that monitors channel state information from individual devices. Channel information sensed from a plurality of devices, such as UE 102.1 and 102.2, can be used to optimally select which devices to serve at a particular instance out of the total available set of devices. In a time-division duplex (TDD) system, the reciprocity of channel state information between the down-link and the up-link permits channel state information to be derived by examining received signals in the up-link and apply the derived information in determining the optimum antenna weights for operation in the down-link. In the 5G New Radio (NR) system, sounding reference signals (SRS) are transmitted by a 5G device (e.g., a particular UE) and used to monitor the uplink channel state.

Beamforming offers benefits for devices where channel state is known. This means channel state for devices in the connected state can be continually updated and the composite beam pattern adapted accordingly. The periodicity of updates is limited by the period of updates to channel state information. In a TDD system, this may be limited by opportunities of devices in the connected state to send uplink information. Still in other frequency division duplex (FDD) systems, this may be limited by the periodicity of sending specific measurement reports that report information pertaining to the downlink channel state.

In certain environments, there will be a high degree of temporal correlation between successive estimation of channel state. Example of such environments can include when serving slow moving devices operated by pedestrian users. Being able to detect that channel state information exhibits a high temporal correlation allows the composite beams to be constructed with a high degree of directivity. Such beams are known as fine beams, where the elevation and/or azimuth arc is reduced to focus on a specific location. In other environments, there may be a low degree of temporal correlation between successive estimation of channel state. Examples of such environments can include when serving fast moving devices operated in a vehicular environment. Being able to detect that channel state information exhibits a low temporal correlation allows the composite beam to be constructed with a lower degree of directivity. Such beams are known as coarse beams, where the elevation and/or azimuth arc is increased to focus on a generalized location.

Whereas beamforming offers benefit to devices in the connected state, mobile systems it is useful to be able to transition devices from the idle state into the connected state. As channel state information is unknown for devices in the idle state, various operations may be involved to assist in the idle state to connected state transitioning procedure. These operations can include using procedures that avoid the use of beamforming during the initial attachment procedure. Such a beam is referred to a broadcast beam, where the elevation and/or azimuth arc is configured to cover the complete coverage area of a particular cell. Other operations include beam sweeping, where a coarse beam is swept across the entire elevation and/or azimuth arc that corresponds to the complete coverage area of a cell in discrete steps with devices configured to repeat their initial access procedures to ensure that a procedure will coincide with coverage of any device in the idle state in any location across a cell coverage area.

During initial attachment procedures, devices such as UEs 102.1 and 102.2 can make use of special signals transmitted in the downlink including the synchronization signal block (SSB) that includes the primary synchronization signal (PSS), the secondary synchronization signal (SSS), and the Channel State Information Reference Symbols (CSI-RS).

In a disaggregated radio access network, such as vRAN 120, beamformer logic is configured for each of RU 130.1, 130.2, and 130.3 and channel state information is determined during demodulation at the DU 132. The operation of the fronthaul network between the DU 132 and each of RU 130.1, 130.2, and 130.3 can be used to signal the information to enable the beamformer logic configured for each of RU 130.1, 130.2, and 130.3 to configure appropriate beam weights.

In one embodiment, the fronthaul interface between DU 132 and each of RU 130.1, 130.2, and 130.3 may be based on the Open RAN (O-RAN) Alliance open fronthaul specification, such as O-RAN.WG4.CUS.0-v05.00, published Nov. 7, 2020. In such an embodiment, upper PHY functionality in the DU 132 may include the modulation/demodulation, scrambling/de-scrambling and channel encoding/decoding functionality, with the remainder of the physical layer functions, sometimes referred to as the lower physical layer, implemented in each of RU 130.1, 130.2, and 130.3. In an open fronthaul implementation, frequency domain in-phase and quadrature information is signaled between the DU 132 and each of RU 130.1, 130.2, and 130.3.

In order to support beamforming, the open fronthaul system may support various beamforming techniques. In one embodiment, pre-defined beams can be defined in each respective RU 130.1, 130.2, and 130.3 and DU 132 for each respective unique cell 136.1, 136.2, and 136.3. Each beam may represent a set of weights and phases applied to the set of antenna elements for each RU and can be represented by a 15-bit beam identifier (beam-ID) in which a beam-ID of zero (0) may correspond to a broadcast beam and other beam-IDs may correspond to predefined antenna patterns. The information that defines the spatial relations between different non-broadcast beam-IDs can be signaled between each of RU 130.1, 130.2, and 130.3 and DU 132. In various embodiments, the information can include whether a beam-ID corresponds to a coarse beam or a fine beam, identification of specific neighboring beam-IDs, and/or identification of any overlapping beam-IDs.

During operation, beam-IDs for each of unique cells 136.1, 136.2, and 136.3 can be signaled in messages sent between the DU 132 and each respective RU 130.1, 130.2, and 130.3 pertaining to each respective unique cell 136.1, 136.2, and 136.3. In the downlink, for example, a beam-ID for a unique cell can be signaled along with frequency domain in-phase and quadrature symbols to a given RU and can be used by the given RU to configure antenna weights when transmitting the corresponding symbols to a given UE 102.1 and/or 102.2 operating in a unique cell operating mode for a particular application traffic flow/PDU session (e.g., as prescribed per an enhanced URSP, as described herein). In the uplink, a beam-ID for a unique cell can be signaled in control plane messages that configure the lower physical layer and can be received by a given RU and used to configure the antenna weights when receiving the corresponding symbols from uplink transmissions obtained from a given UE 102.1 and/or 102.2 operating in a unique cell operating mode for a particular application traffic flow/PDU session (e.g., as prescribed per an enhanced URSP, as described herein).

In a shared cell, such as shared cell 138, frequency domain in-phase and quadrature symbols can be signaled to each of RUs 130.1, 130.2, and 130.3 which can then simultaneously transmit the same information. In the uplink for shared cell 138, common control plane messages are sent to each RU 130.1, 130.2, and 130.3 to configure the lower physical layer to simultaneously receive a set of symbols and signal such symbols to DU 132. Thus, it is to be understood that if a beam-ID of zero (0) is used in the signaling, then each of the plurality of RUs 130.1, 130.2, and 130.3 will use their corresponding broadcast beams for the operation of the shared cell 138. As an optimization in at least one embodiment, the beam space corresponding to a 15-bit beam-ID can be partitioned between individual RUs 130.1, 130.2, and 130.3. In such an embodiment, the beamforming RUs 130.1, 130.2, and 130.3 can effectively be operated as a single distributed multi-antenna system.

In contrast to a single RU system in which an RU is able to signal a DU information regarding the relationships between beam-IDs, in a distributed system as provided via vRAN 120 such information may be determined based on the spatial relationships between RU 130.1, 130.2, and 130.3 and, hence, may not be known a priori by an RU. Rather, the DU 132 can use frequency domain in-phase and quadrature symbols received from the RUs 130.1, 130.2, and 130.3 to determine the effective beam relations.

In one embodiment, the DU 132 can signal the individual RUs 130.1, 130.2, and 130.3 with information of which beam-ID may be used for an additional broadcast beam. For example, DU 132 may configure the RU 130.1 to use a beam-ID 1 as an additional broadcast beam, may configure the RU 130.2 to use a beam-ID 2 as an additional broadcast beam, and may configure the RU 130.3 to use beam-ID 3 as an additional broadcast beam. On initialization, DU 132 may not know the relations between beam-ID 1, beam-ID 2 and beam-ID 3. When serving a particular UE 102.1 and/or UE 102.2 operating in a shared cell operating mode for a particular application traffic flow/PDU session, for example, the DU 132 can configure beam-ID 1, beam-ID 2 and beam-ID 3 to simultaneously serve the uplink reception from a particular UE and DU 132 can receive corresponding frequency domain in-phase and quadrature symbols from RU 130.1, 130.2, and 130.3. By processing these signals, DU 132 can determine the signal quality of the symbols received by the different RUs 130.1, 130.2, and 130.3 for uplink transmissions by a given UE 102.1 and/or UE 102.2 operating in a shared cell operating mode for a particular application traffic flow/PDU session. For example, this processing can indicate that while RU 130.3 may receive the best quality signal from the given UE 102.1 and/or 102.2 operating in the shared cell operating mode for a particular application traffic flow/PDU session, RU 130.2 may receive the second best quality. The DU 132 can therefore determine that there is a spatial beam relationship between beam-ID 3 on RU 130.3 and beam-ID 2 on RU 130.2.

After such a period of determination, DU 132 can flexibly configure the RUs 130.1, 130.2, and 130.3 to operate in a range of configurations. Using beam-ID 0, for example, the DU 132 can operate using shared cell 138 where all RUs 130.1, 130.2, and 130.3 are used to simultaneously to serve a given UE 102.1 or UE 102.2 operating in the shared cell operating mode for a particular application traffic flow/PDU session. In another example, using beam-ID 1, beam-ID 2, or beam-ID 3, the DU 132 can operate using a broadcast from a particular RU to serve a given UE 102.1 or 102.2 operating in the shared cell operating mode for a particular application traffic flow/PDU session. In yet another example, using a combination of beam-ID 1 and beam-ID 2, using a combination of beam-ID 1 and beam-ID 3, or using a combination of beam-ID 2 and beam-ID 3, the DU 132 can operate using a distributed beamforming system from a plurality of RU 130.1, 130.2, and/or 130.3 to serve a given UE 102.1 or UE 102.2 operating in the shared cell operating mode for a particular application traffic flow/PDU session.

Consider an operational example involving UE 102.1 discussed with reference to FIGS. 2A, 2B, 2C, 2D, and 2E, which are a message sequence diagram illustrating a call flow 200 associated with providing DC support for UE 102.1 in the hybrid cell vRAN 120 architecture of FIG. 1 utilizing an enhanced URSP, according to an example embodiment. FIGS. 2A, 2B, 2C, 2D, and 2E include UE 102.1, RU 130.1, DU 132, CU 134, AMF 112, SMF 114, and policy server 106. Various example details for call flow 200 may be discussed with reference to FIG. 1 for illustrative purposes.

RAN-EMS 104 is not illustrated in FIGS. 2A, 2B, 2C, 2D, and 2E but may be referenced with regard to various operations. For example, at 201a consider that the vRAN 120 is configured via RAN-EMS 104 to provide the hybrid cell configuration in order to provide both shared cell 138 and unique cells 136.1, 136.2, and 136.3. For example, DU 132 can be configured via RAN-EMS 104 to operate in two operating modes (shared cell and unique cell operating modes) concurrently, each RU 130.1, 130.2, and 130.3 that DU 132 serves can be configured to operate concurrently in a shared cell mode and a unique cell mode to provide both a unique cell and the shared cell (note, RU 130.2 and 130.3 are not shown in FIGS. 2A, 2B, 2C, 2D, and 2E), and a frequency allocation along with cell ID (e.g., E-CGI/NR-CGI) and PCI (e.g., E-PCI/NR-PCI) can be provided between both modes.

Further, processing element endpoint configuration information can be provided for each RU-DU pairing. In various embodiments, a processing element endpoint configuration, depending on the transport type/network connectivity (e.g., Ethernet, IP, etc.) between DU 132 and each RU 130.1, 130.2, and 130.3, may identify any of: different (alias) Media Access Control (MAC) addresses, virtual local area network (VLAN) identity and MAC addresses; and/or User Datagram Protocol (UDP) ports and IP addresses for the DU to which each RU is assigned. A particular processing element endpoint definition configured for a given RU/DU assignment can be provided a 'name' or other identifier that can be used by other systems, nodes, etc. (e.g., RAN-EMS 104) in order to tie UE flows to DU 132.

For the configuration at 201a, RAN-EMS 104 can communicate to DU 132 the operating modes of the unique cell 136.1 and the shared cell 138 to be operated by RU 130.1, the frequency allocation along with cell ID (e.g., E-CGI/NR-CGI) and PCI (e.g., E-PCI/NR-PCI) for each cell, and pairing information for the processing element endpoint configuration for each of RU 130.1 and DU 132 for the RU 130.1—DU 132 pairing. For the present example, consider that unique cell 136.1 is associated with a first NR-CGI (NR-CGI #1) and a first NR-PCI (NR-PCI #1) and that shared cell 138 is associated with a second NR-CGI (NR-CGI #2) and a second NR-PCI (NR-PCI #2).

Thereafter, DU 132 can communicate the NR-CGI and NR-PCI information for each cell to be provided by RU 130.1 along with the operating mode for each cell and the CU 134 can activate each cell for RU 130.1 in the shared or unique operating mode based on the configuration. Similar operations can be performed for RU 130.2 and RU 130.3 in accordance with embodiments herein.

Further at 201, RAM-EMS 104 can obtain one or more beam resource policies that may be configured for policy server 106 and may configure the one or more beam resource policies for DU 132 and RUs 130.1, 130.2, and 130.3 that can be utilized for each unique cell 136.1, 136.2, and 136.3 and shared cell 138 (e.g., using various operations, as discussed above).

Further at 201a, in at least one embodiment RAN-EMS 104 can configure the vRAN 120 to advertise (via the DU 132 and RU 130.1) the capability of the vRAN to support dual-connectivity (DC) operation across both the shared cell 138 and the unique cell 136.1 (and also unique cell 136.2 for RU 130.2 and unique cell 136.3 for RU 130.3). In one embodiment, DC support can be advertised as part of a first System Information Block (SIB1) broadcast for each cell, as shown at 201b for RU 130.1, for example. In some embodiments, the vRAN 120 may not advertise DC support via SIB1 broadcasts.

As shown at 202, consider that policy server is configured with an enhanced URSP for UE 102.1 that includes an operating mode for the UE (shared cell or unique cell) mapped to an AppID for each of one or more applications that may be operated by UE 102.1. The UE 102.1 can be identified for the enhanced URSP using any UE/subscriber identifying information (e.g., IMSI, IMEI, etc.), UE group/class/type information, etc.

A first application (e.g., a non-business-critical/non-business-related application operated via best effort app server 154)) can be identified in the enhanced URSP at 202 for UE 102.1 as AppID-1 associated with a slice identifier, NSSAI-1 for data network 150, DNN(150), an NR RAT Type, and a unique cell operating mode (Unique-cell) and a second application (e.g., a business-critical/business-related application operated via critical app server 152) can be identified as AppID-2 associated with slice NSSAI-1 for data network 150 (DNN(150)), an NR RAT type, and a shared cell operating mode (Shared-Cell) as shown at 202. Further, the enhanced URSP and/or any other policy (e.g., subscription information) for UE 102.1 can be extended to include an indication that the UE 102.1 is allowed/approved for DCNR operation via vRAN 120 (e.g., mode: DCNR), as shown at 202. It is to be understood that the enhanced URSP illustrated at 202 is provided for illustrative purposes only and is not meant to limit the broad scope of the present disclosure. In some embodiments, beam resource information/policies could also be provided for an enhanced URSP configured for a UE (e.g., a single beam ID identified for a unique cell operating mode or broadcast beam resources identified for broadcast beam resources) and/or other information could be included in an enhanced URSP.

As shown at 203, UE 102.1 may connect to vRAN 120 any cell during initial cell-selection procedure to perform a UE RRC setup over any cell via RU 130.1/DU 132/CU 134, as shown at 204, and a Non-Access Stratum (NAS) registration request as shown at 205a and 205b via AMF 112. The CU 134 can identify that UE 102.1 is connected to a shared cell or a unique cell based on the RRC signaling with UE 102.1 at 204 (e.g., the CU 134 determines the NR-CGI/NR-PCI for the cell and knows whether the cell is a shared or unique cell based on the configuration of vRAN 120, as discussed for 201a). The cell to which the UE 102.1 initially connects may be referred to herein as the first, primary, or master cell. As discussed in further detail below, the UE 102.1 can later connect to another cell, which may be referred to herein as the second or secondary cell.

In various embodiments, a UE, such as UE 102.1 can initiate a connection with a mobile core network, such as mobile core network 110, utilizing an operating mode (shared cell or unique cell) as selected by the UE, utilizing an operating mode as configured for the UE by an enterprise (e.g., via Subscriber Identification Module (SIM) profile attributes defining a preferred operating mode for the UE), combinations thereof, and/or the like.

Obtaining the NAS registration request for UE 102.1 by AMF 112 at 205b triggers AMF 112 to validate if UE 102.1 is allowed for dual-connectivity operation (e.g., mode for the UE is set to indicate DCNR) and, if so, to obtain the enhanced URSP policy for UE 102.1. For example, at 206, 207, 208, and 209, AMF 112 performs an authentication for UE 102.1 per 3GPP standards (e.g., 3GPP TS 23.501, 33.501, 37.340, and 23.503) via policy server 106. Through the authentication of UE 102.1, AMF 112 obtains the enhanced URSP policy for UE 102.1 from policy server 106 (e.g., using the IMSI, IMEI, SUPI, etc. or a combination thereof for UE 102.1), as shown at 210, and determines that UE 102.1 is approved/allowed for DCNR operation. In some embodiments, UE 102.1 could include an indication that it is dual-connectivity capable in the registration request at 205a/205b in which the AMF 112 could still determine whether the UE is approved/allowed for DC operation and obtain an enhanced URSP for UE 102.1 (containing AppID to operating mode information, etc.) via policy server 106 during authentication of UE 102.1.

Figure 2A:
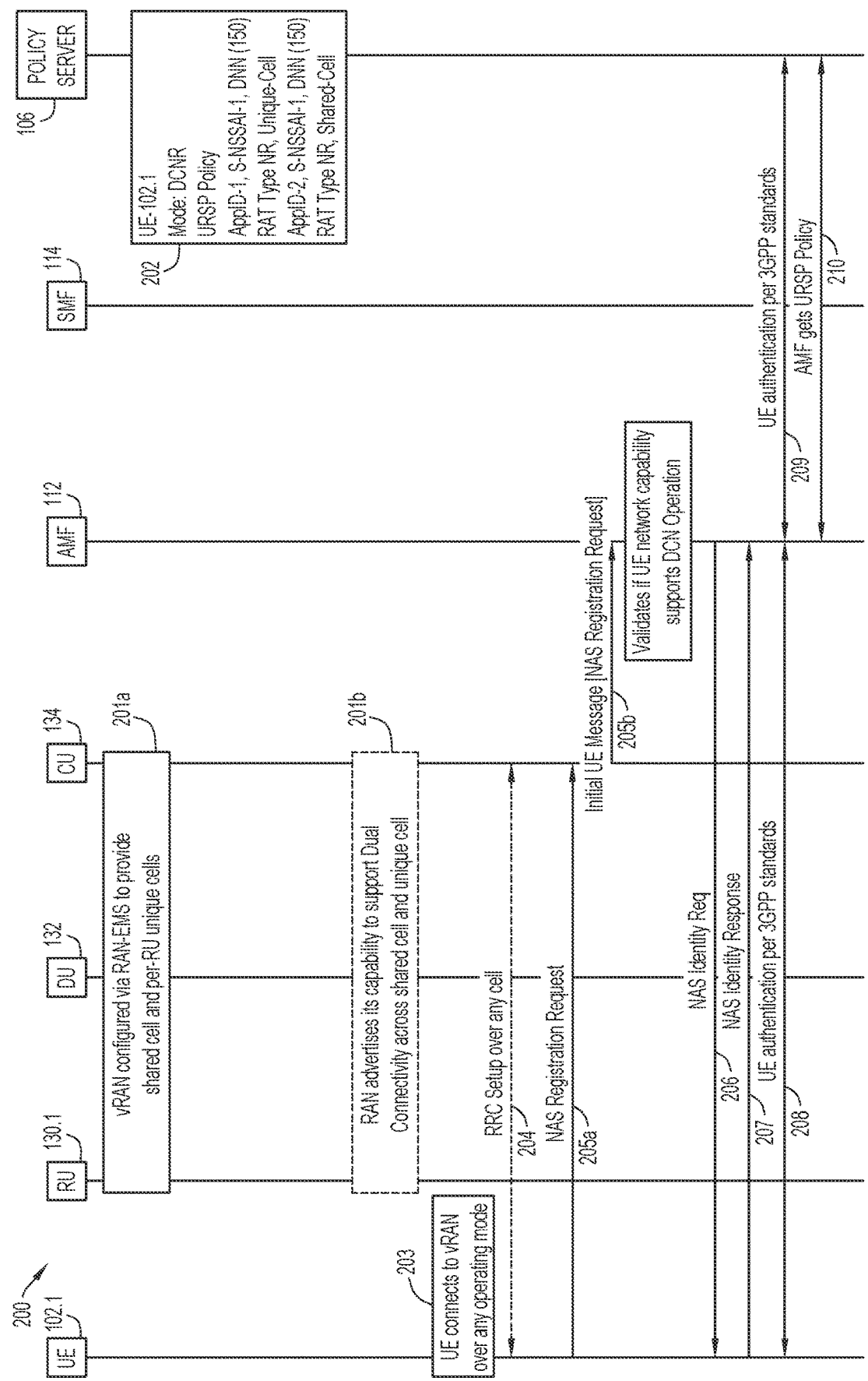
FIGS. 2A, 2B, 2C, 2D, and 2E are a message sequence diagram illustrating a call flow associated with providing DC support for a UE in the hybrid cell vRAN architecture of FIG. 1, according to an example embodiment.
Figure 2B:
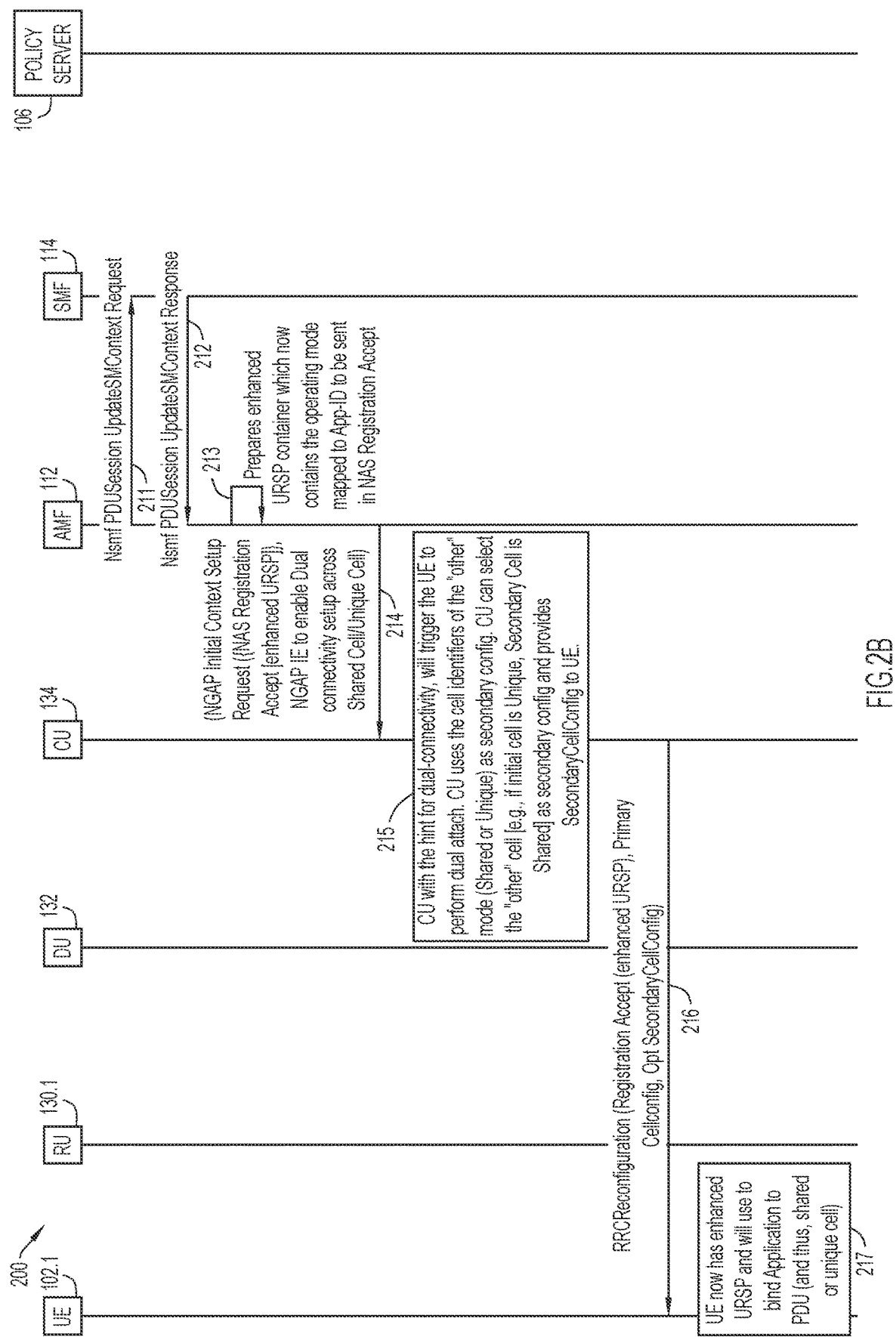

Upon successful authentication of UE 102.1 including determining that UE 102.1 is approved for DC operation, AMF 112 performs a session management context update for UE 102.1 with SMF 114, as shown at 211 and 212 of FIG. 2B. At 213, AMF 112 prepares or generates an enhanced URSP container that contains the operating mode mapped to AppID, as obtained from policy server 106 at 210. As shown at 214, AMF 112 sends an Ng Application protocol (NgAP) Context Setup Request message including a NAS registration accept containing the enhanced URSP container. The message further includes an NgAP Information Element (IE) that includes an indication to enable dual-connectivity setup (via CU 134) across both a shared and a unique cell for UE 102.1 (as provided via RU 130.1).

As shown at 215, upon obtaining the NgAP message from AMF 112, CU 134 has an indication (e.g., a "hint") for dual-connectivity for UE 102.1 that can be used to trigger the UE to perform a dual attach and the CU 134 uses the cell IDs of the "other" operating mode (shared or unique in which the "other" is the operating mode through which the UE 102.1 is not currently connecting to the network) as a secondary RRC configuration for the UE. The CU 134 can select the "other" cell as the secondary configuration (e.g., if initial/primary connection for the UE is to a unique cell, then the secondary cell configuration is the shared cell) and can provide a secondary cell configuration to the UE. At 216, CU 134 sends an RRC Reconfiguration accept message to UE 102.1 that includes the enhanced URSP container, along with cell configuration parameters for the primary cell (e.g., frequency information, cell ID information (E-CGI/NR-CGI), PCI/NR-PCI, beam resource information, etc. for the shared or unique cell that is the primary cell with which the UE is currently connecting). In some embodiments as shown at 216, the CU 134 can also send secondary cell configuration parameters (e.g., frequency information, cell ID information (E-CGI/NR-CGI), PCI/NR-PCI, beam resource information, etc.) for the "other" cell type to which the UE 102.1 can connect (e.g., shared or unique, depending on the primary cell with which the UE initially connects), as may be prescribed generally by 3GPP TS 37.340. In one example for an embodiment in which vRAN 120 may not broadcast a capability to support DC operation, the CU 134 can include cell configuration parameters for the shared or unique cell that is the 'other'/secondary cell to which the UE can connect.

Thus, as shown at 217, UE 102.1 has the mapping information contained in the enhanced URSP and can use the information to bind one or more applications utilized by the UE to an operating mode (shared or unique) for any PDU session to be initiated for each of the one or more applications. Accordingly, UE 102.1 can obtain information mapping each of one or more application ID(s) to operating mode information for each application ID, beam resource information, slice information, DNN information, etc. as may be provided in an enhanced URSP as discussed for embodiments herein.

Figure 2C:
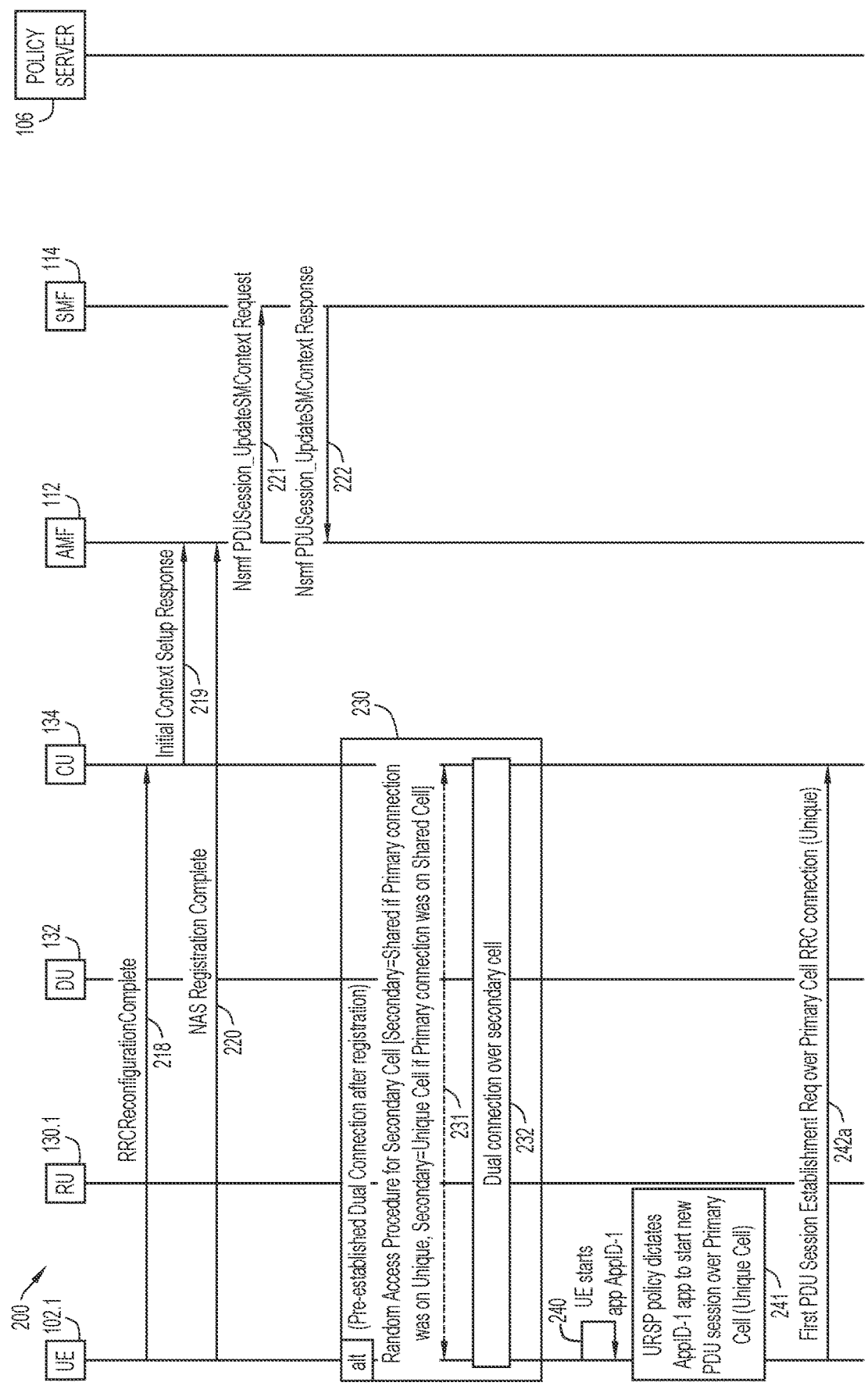
Figure 2D:
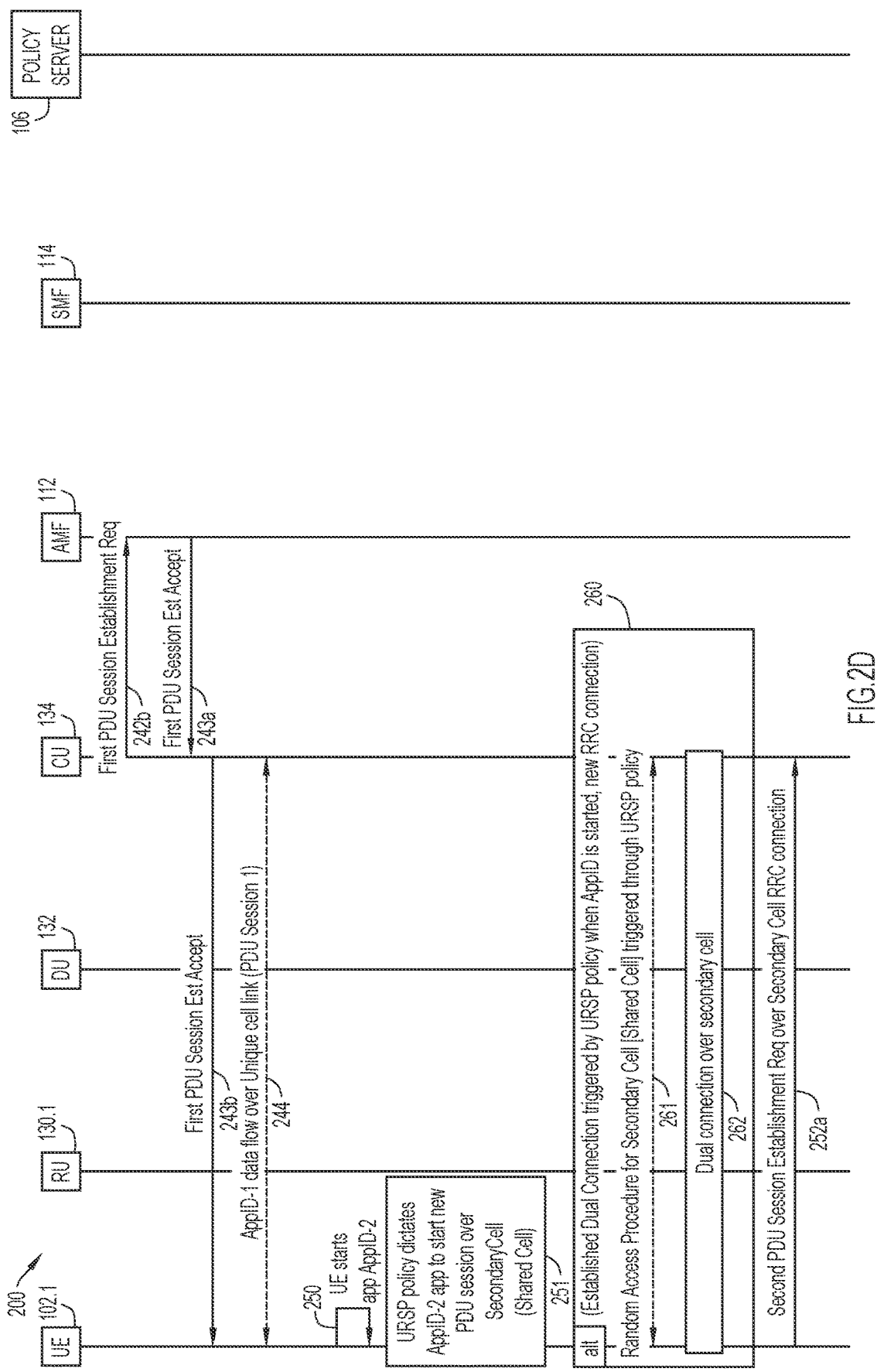
Figure 2E:
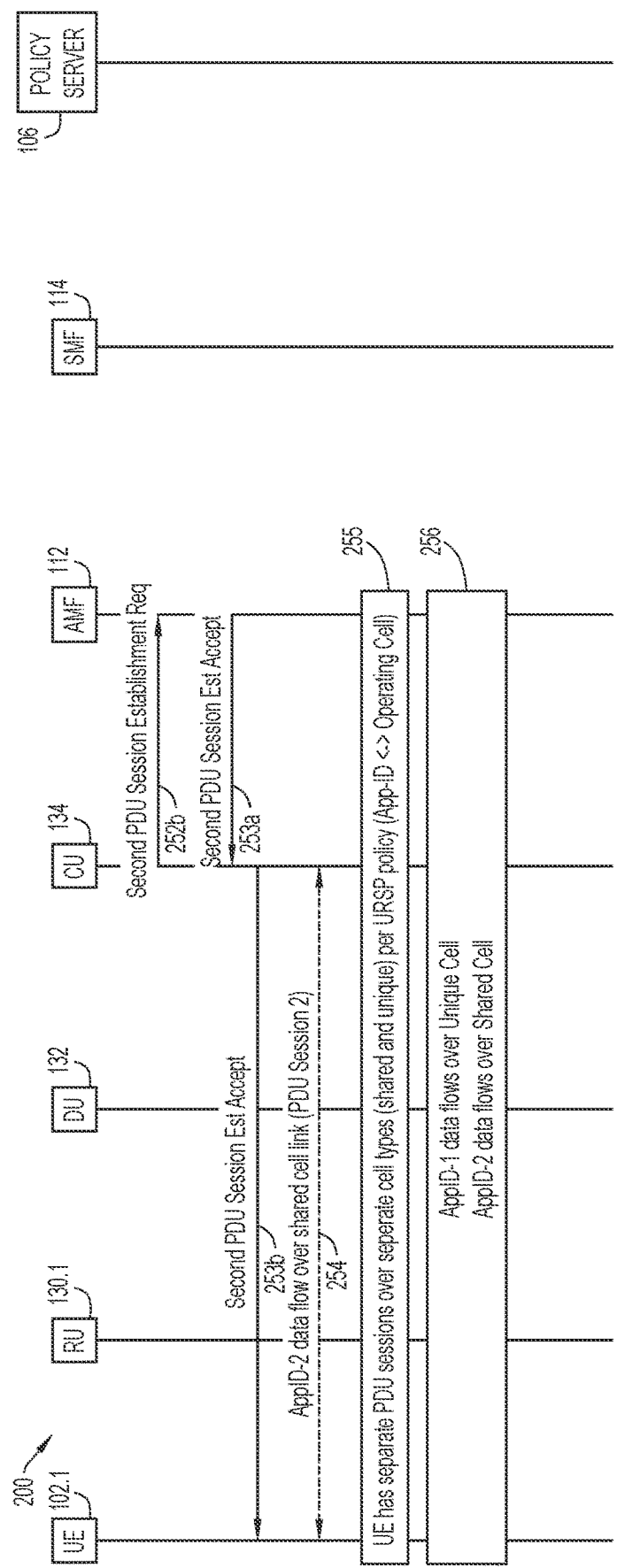

Turning to FIG. 2C, at 218, 219, and 220 the RRC Reconfiguration and NAS registration processes are completed for UE 102.1 via CU 134 and AMF 112, which performs another context update for the UE 102.1 via SMF 114, as shown at 221 and 222.

In some embodiments, as shown at 230, the UE 102.1 can pre-establish dual-connectivity over the secondary cell following completion of the registration via the primary cell. For example, at 231, a random access procedure can be performed between UE 102.1 and CU 134 for the secondary cell. The secondary cell could be a shared cell if the primary connection was on a unique cell for the UE and the secondary cell could be a unique cell if the primary connection was on a shared cell for the UE. Thus, dual-connection over the secondary cell for the UE 102.1 can be established as shown at 232, prior to the UE initiating a PDU session for an application mapped to an operating mode that is different than the operating mode through which the primary connection is established.

In one example, consider at 240 that UE 102.1 starts/activates/launches an application corresponding to AppID-1 (e.g., a non-business-critical/non-business related application operated via best effort app server 154). In this example, consider that the primary cell through which UE 102.1 connected to the network was unique cell 136.1 provided by RU 130.1. Based on the enhanced URSP policy for the UE 102.1 (as discussed at 202), the UE 102.1 determines, at 241, that the operating mode associated with AppID-1 is the unique cell operating mode; thus, the UE is to initiate a PDU session for AppID-1 over the primary cell, unique cell 136.1. Thereafter, at 242a and 242b (FIG. 2D) and 243a and 243b, UE 102.1 establishes a first PDU session (PDU session 1) over the primary cell RRC connection via CU 134 and AMF 112 such that a data flow for AppID-1 is communicated between the UE 102.1 and the network via the unique cell 136.1 radio communication link as shown at 244, which is also illustrated in FIG. 1 for the radio communication link between UE 102.1 and unique cell 136.1.

Any beam resources that may be configured for vRAN 120 for the unique cell operating mode, such as a single beam ID that the UE 102.1 can access for the unique cell 136.1, can also be utilized by the UE 102.1 in some embodiments. Although not illustrated in FIG. 2D, the PDU session for AppID-1 can facilitate communication between UE 102.1 and best effort app server 154.

In another example, consider at 250 that UE 102.1 starts/activates another application corresponding to AppID-2 (e.g., a business-critical/business-business related application operated via critical app server 152). In this example, consider that the primary cell through which UE 102.1 connected to the network was unique cell 136.1 provided by RU 130.1 through which the UE is currently operating the application corresponding to AppID-1 via the unique cell operating mode. Based on the enhanced URSP policy for the UE 102.1 (as discussed at 202), the UE 102.1 determines, at 251, that the operating mode associated with AppID-2 is the shared cell operating mode; thus, the UE is to initiate a PDU session for AppID-2 over the secondary cell, shared cell 138.

As noted above at 230, 231, and 232, in some embodiments a UE can initiate a secondary connection upon completing the RRC registration for the primary cell connection. However, in other embodiments, a UE can initiate a secondary connection upon starting/activating an application that is mapped to an operating mode that is different than the operating mode of the primary connection, as shown at 260. For example, at 261 a random access procedure can be performed between UE 102.1 and CU 134 for the secondary cell through which dual-connection for the UE 102.1 can be established as shown at 262.

Following either pre-establishment of the secondary cell connection (at 230, 231, and 232) or establishment of the secondary cell connection upon activating an application associated with a secondary cell (e.g., AppID-2 as shown at 260, 261, and 262), UE 102.1 establishes a second PDU session over the secondary cell RRC connection via shared cell 138, as shown at 252a and 252b (FIG. 2E) and 253a and 253b via CU 134 and AMF 112 such that a data flow for AppID-2 is communicated between the UE 102.1 and the network via the shared cell 138 radio communication link for the second PDU session (PDU session 2) as shown at 254, which is also illustrated in FIG. 1 for the radio communication link between UE 102.1 and shared cell 138. Any beam resources that may be configured for the shared cell operating mode via the enhanced URSP, such as an indication of broadcast beam resources that the UE 102.1 can access for the shared cell 138, can also be utilized by the UE 102.1 in some embodiments. Although not illustrated in FIG. 2E, the PDU session for AppID-2 can facilitate communication between UE 102.1 and critical app server 152.

Thus, as illustrated in FIGS. 2A, 2B, 2C, 2D, and 2E, UE 102.1 can have at least two separate active PDU sessions over at least two separate cell types (shared and unique) per the enhanced URSP policy that maps one or more AppID(s) to each of a shared cell operating mode or a unique cell operating mode, as shown at 255. For example, UE 102.1 can have AppID-1 data flows over unique cell 136.1 for the first active PDU session involving AppID-1 communications and AppID-2 data flows over shared cell 138 for the second active PDU session involving AppID-2 communications, as shown at 256.

Figure 3:
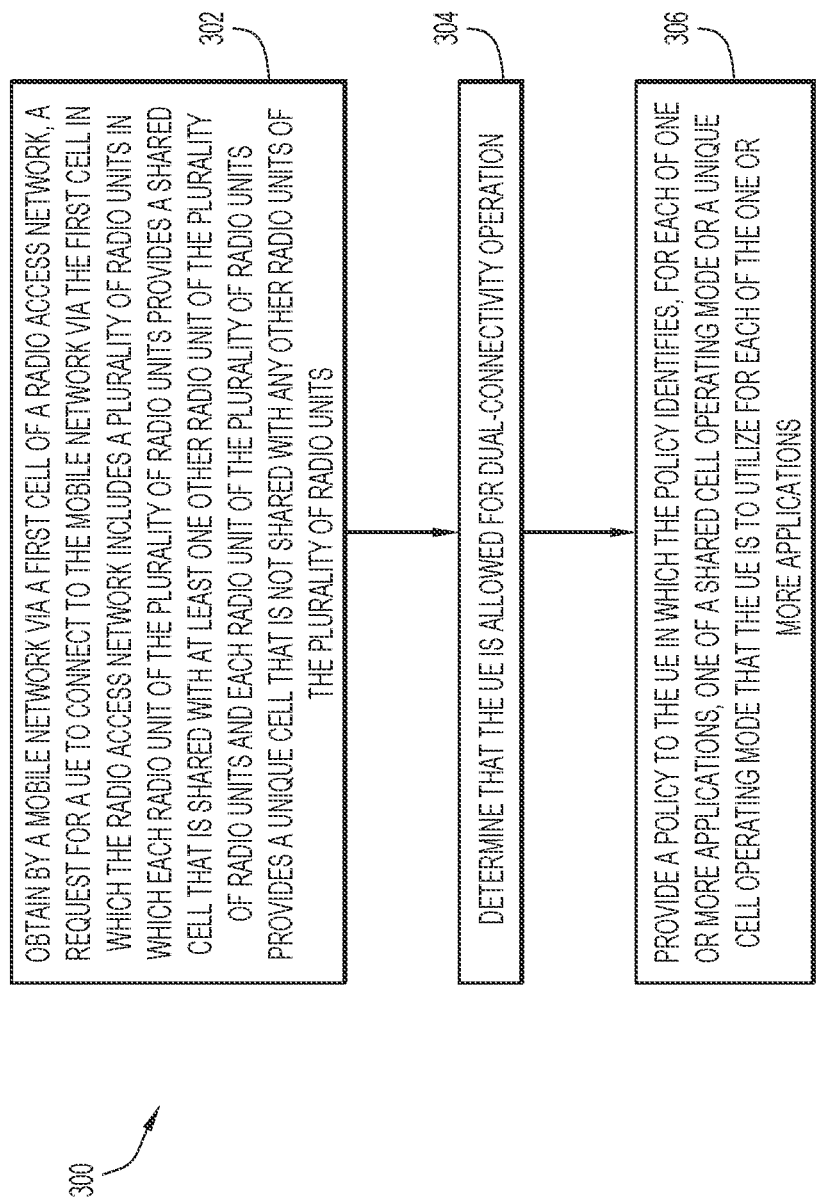
FIG. 3 is a flow chart depicting a method according to an example embodiment.

Referring to FIG. 3, FIG. 3 is a flow chart depicting a method 300 according to an example embodiment. In at least one embodiment, method 300 illustrates example operations that may be performed, at least in part, by an AMF, such as AMF 112, in order to provide dual-connectivity support for a UE in a hybrid cell vRAN architecture (e.g., vRAN 120), according to an example embodiment.

Consider, at 302 that the method may include obtaining by a mobile network (e.g., AMF 113) via a first cell of a radio access network (e.g., vRAN 120), a request for a UE to connect to the mobile network via the first cell in which the radio access network includes a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units. For example, the request may be a NAS registration request initiated by the UE (e.g., as shown at 205a/205b of FIG. 2A).

At 304, the method may include determining that the UE is allowed for dual-connectivity operation. In one embodiment, determining that the UE is allowed for dual-connectivity operation capable can include obtaining an indication from the UE via the request that indicates that the UE is dual-connectivity capable and determining that the UE is allowed for dual-connectivity operation based on a policy for the UE that includes the indication that the UE is allowed for dual-connectivity operation. In one embodiment, determining that the UE is allowed for dual-connectivity operation may merely be based on a policy for the UE that includes the indication that the UE is allowed for dual-connectivity operation.

At 306, the method may include providing a policy (e.g., an enhanced URSP) to the UE in which the policy identifies, for each of one or more applications, one of a shared cell operating mode or a unique cell operating mode that the UE is to utilize for each of the one or more applications. In at least one embodiment, the method may include obtaining the policy (e.g., enhanced URSP) by an AMF (e.g., AMF 112) from a policy server (e.g., policy server 106). The policy may include an application identity for each of the one or more applications that is mapped to one of the shared cell operating mode or the unique cell operating mode.

Other operations may be performed in accordance with techniques herein. For example, in some embodiments, the method may include advertising, by each radio unit of the plurality of radio units, an indication that the radio access network supports dual-connectivity operation. In some embodiments, based on determining that the UE is allowed for dual-connectivity operation, the method may include causing the UE to connect to the mobile network via a second cell of the radio access network while the UE is connected to the first cell. The first cell may be a shared cell and the second cell may be a unique cell or the first cell may be a unique cell and the second cell may be a shared cell such that the first cell and the second cell are different cell types (e.g., shared or unique).

In some embodiments, the UE can establish a PDU session for a particular application via the shared cell or a particular unique cell provided by a particular radio unit based on the policy (e.g., enhanced URSP) obtained by the UE. In one embodiment, the first cell can be provided by the particular radio unit and the UE can connect to the mobile network via a second cell of the particular radio unit to establish the PDU session for the particular application. The UE can have another PDU session for another application via the first cell such that the UE can have two active PDU sessions via different cell types (e.g., a first PDU session for an application via a shared cell and a second PDU session for an application via a unique cell).

Figure 4:
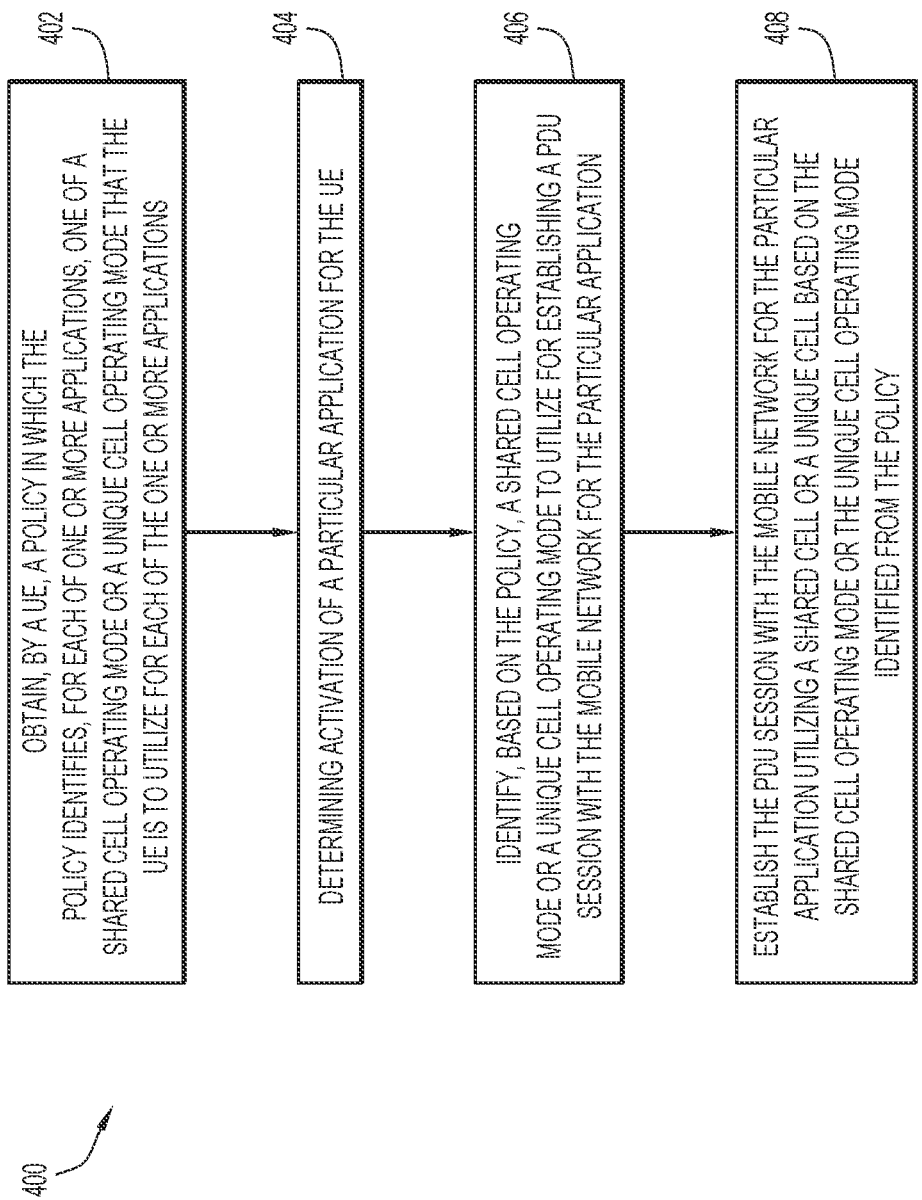
FIG. 4 is another flow chart depicting another method according to an example embodiment.

Referring to FIG. 4, FIG. 4 is a flow chart depicting another method 400 according to an example embodiment. In at least one embodiment, method 400 illustrates example operations that may be performed, at least in part, by an UE, such as UE 102.1 and/or UE 102.2, in order to communicate application data flows via a corresponding cell operating mode, according to an example embodiment.

Consider, at 402 that the method may include obtaining, by a UE, a policy (e.g., an enhanced URSP) in which the policy identifies, for each of one or more applications, one of a shared cell operating mode or a unique cell operating mode that the UE is to utilize for each of the one or more applications. The policy may include an application identity for each of the one or more applications that is mapped to one of the shared cell operating mode or the unique cell operating mode.

At 404, the method may include determining activation of a particular application for the UE. For example, the particular application may be started/opened/launched by a user of the UE, the particular application may initiate/launch, on its own, a session with an application server (e.g., critical app server 152 or best effort app server 154), the particular application may be triggered to initiate/launch a session based on a triggering event (e.g., time of day, environmental event, etc.) combinations thereof, and/or the like. At 406, the method may include identifying, based on the policy obtained by the UE, a shared cell operating mode or a unique cell operating mode to utilize for establishing a PDU session with the mobile network for the particular application. At 408, the method may include establishing the PDU session for the application with the mobile network via a shared cell or a unique cell based on the shared cell operating mode or the unique cell operating mode identified from the policy.

Figure 5:
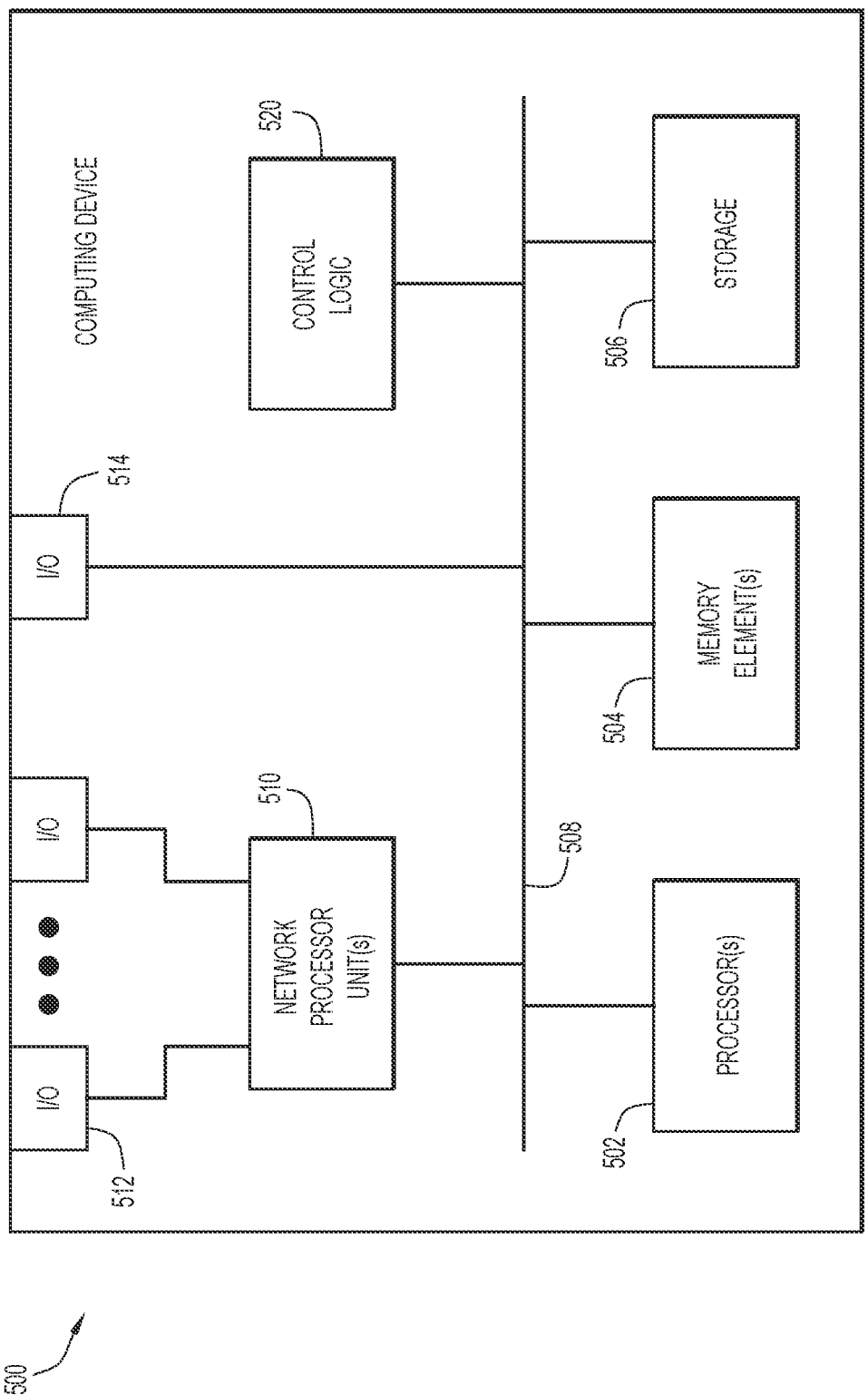
FIG. 5 is a hardware block diagram of a computing device that may perform functions associated with any combination of operations, in connection with the techniques discussed herein.

Referring to FIG. 5, FIG. 5 illustrates a hardware block diagram of a computing device 500 that may perform functions associated with operations discussed herein. In various embodiments, a computing device or apparatus, such as computing device 500 or any combination of computing devices 500, may be configured as any entity/entities as discussed herein in order to perform operations of the various techniques discussed herein, such as, for example, any of AMF 112, SMF 114, RAN-EMS 104, CU 134, DU 132, and/or any other network element discussed for embodiments herein.

In at least one embodiment, computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device. Processor(s) 502 (e.g., hardware processor(s)) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 408 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 520 can include instructions that, when executed, cause processor(s) 502 to perform operations including obtaining, by a mobile network via a first cell of a radio access network, a request for a user equipment to connect to the mobile network via the first cell, wherein the radio access network comprises a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units; determining that the user equipment is allowed for dual-connectivity operation; and providing a policy (e.g., an enhanced URSP) to the user equipment, wherein the policy identifies, for each of one or more applications, one of a shared cell operating mode or a unique cell operating mode that the user equipment is to utilize for each of the one or more applications.

Figure 6:
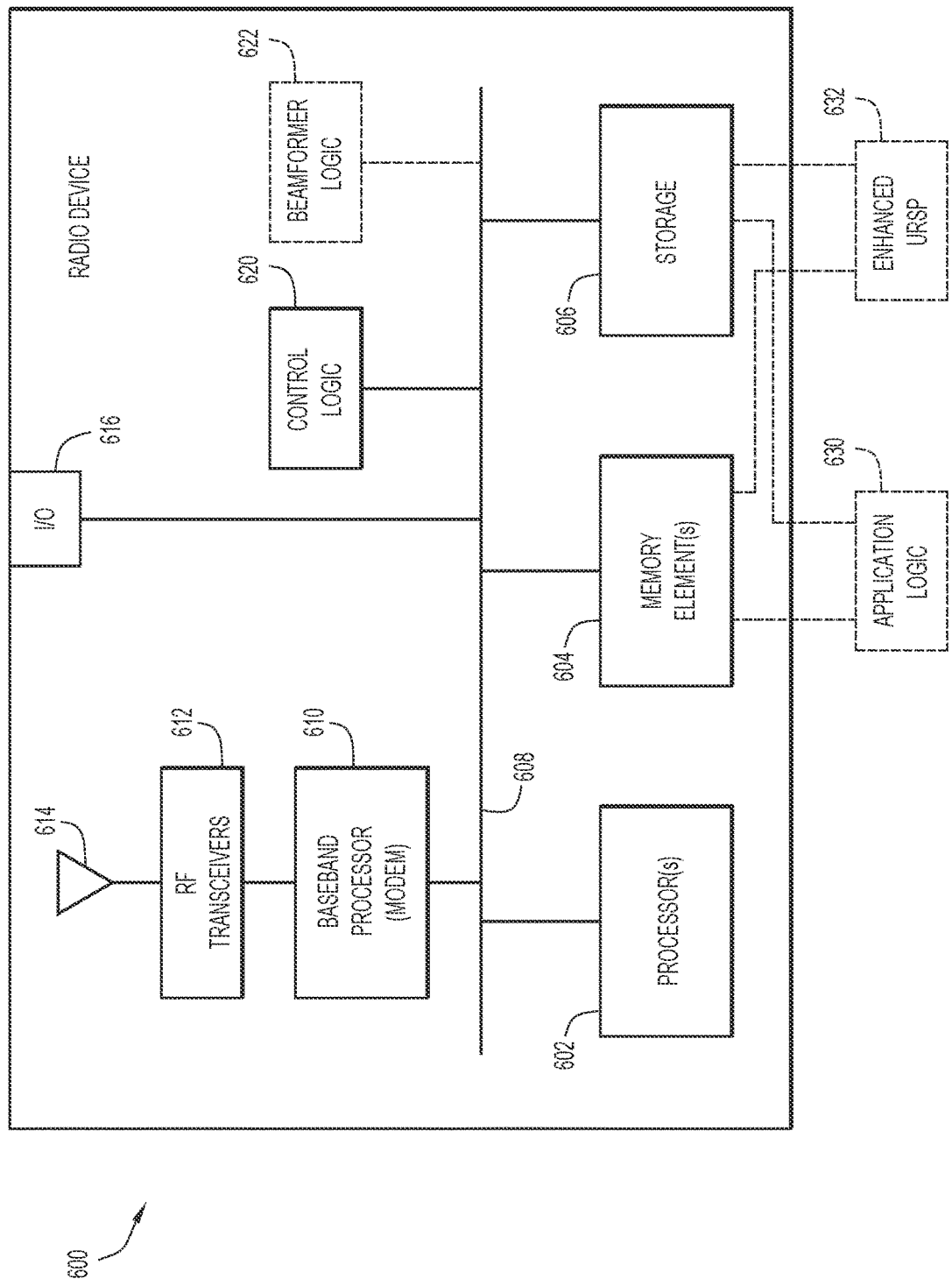
FIG. 6 is a hardware block diagram of a radio device that may perform functions associated with any combination of operations, in connection with the techniques discussed herein.

Referring to FIG. 6, FIG. 6 illustrates a hardware block diagram of a radio device 600 that may perform functions associated with operations discussed herein. In various embodiments, a radio device or apparatus, such as radio device 600 or any combination of radio devices 600, may be configured as any radio node/nodes as depicted herein in order to perform operations of the various techniques discussed herein, such as operations that may be performed by any of an RU (e.g., any of RU 130.1, 130.2, and 130.3) or a UE (e.g., any of UEs 102.1 and 102.2).

In at least one embodiment, radio device 600 may be any apparatus that may include one or more processor(s) 602, one or more memory element(s) 604, storage 606, a bus 608, a baseband processor or modem 610, one or more radio RF transceiver(s) 612, one or more antennas or antenna arrays 614, one or more I/O interface(s) 616, and control logic 620. In various embodiments, instructions associated with logic for radio device 600 can overlap in any manner and are not limited to the specific allocation of instructions and/or operations described herein. For embodiments in which radio device 600 may be implemented as an RU, the radio device 600 may additionally include beamformer logic 622 to perform beam resource related operations, as discussed herein. In various embodiments, instructions associated with logic for radio device 600 can overlap in any manner and are not limited to the specific allocation of instructions and/or operations described herein.

The one or more processor(s) 602, one or more memory element(s) 604, storage 606, bus 608, and I/O interface(s) 616 may be configured/implemented in any manner described herein, such as described above at least with reference to FIG. 5. In one embodiment in which radio device 600 may be implemented as a UE, application logic 630 for operating one or more applications (e.g., business-critical/business-related applications, non-business-critical/non-business-related applications, etc.) and an enhanced URSP 632 as obtained from a mobile core network identifying one or more applications mapped to corresponding shared or unique cell operating modes (e.g., AppID->operating mode) may be stored in any combination of memory element(s) 604 and/or storage 606.

The RF transceiver(s) 612 may perform RF transmission and RF reception of wireless signals via antenna(s)/antenna array(s) 614, and the baseband processor (modem) 610 performs baseband modulation and demodulation, etc. associated with such signals to enable wireless communications for radio device 600.

In various embodiments, control logic 620, can include instructions that, when executed, cause processor(s) 602 to perform operations, which can include, but not be limited to, providing overall control operations of radio device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation in which radio device 600 is implemented as a UE, control logic 620 can include instructions that, when executed, cause processor(s) 602 to perform operations including obtaining, by the radio device, a policy (e.g., an enhanced URSP) in which the policy identifies, for each of one or more applications, one of a shared cell operating mode or a unique cell operating mode that the radio device is to utilize for each of the one or more applications; determining activation of a particular application for the radio device; identifying, based on the policy, a shared cell operating mode or a unique cell operating mode to utilize for establishing a PDU session with the mobile network for the particular application; and establishing the PDU session for the application with the mobile network via a shared cell or a unique cell based on the shared cell operating mode or the unique cell operating mode identified from the policy.

In various embodiments, beamformer logic 622, if implemented, can include instructions that, when executed, cause processor(s) 602 to perform beam related operations as discussed herein, which can include, but not be limited to, providing beamforming operations (e.g., transmissions, receptions, signaling, measurements, etc.); interacting with other entities, systems, etc. (e.g., DU 132); maintaining and/or interacting with stored data, information, parameters, etc. (e.g., memory element(s), storage, data structures, databases, tables, etc. storing beam-ID/beam resource information, etc.); combinations thereof; and/or the like to facilitate various operations for embodiments described herein.

The programs described herein (e.g., control logic 520/620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504/604 and/or storage 506/606 can store data, software, code, instructions (e.g., processor instructions), logic, parameters, combinations thereof, and/or the like used for operations described herein. This includes memory element(s) 504/604 and/or storage 506/606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a node of a mobile network via a first cell of a radio access network, a request for a user equipment to connect to the mobile network via the first cell, wherein the radio access network comprises a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units; determining that the user equipment is allowed for dual-connectivity operation; and providing a policy to the user equipment, wherein the policy identifies, for each of one or more applications, one of a shared cell operating mode or a unique cell operating mode that the user equipment is to utilize for each of the one or more applications. In one instance, the method may include obtaining the policy for the user equipment from a policy server. In one instance, the policy may be an enhanced UE Route Selection Policy (URSP).

In one instance, determining that the user equipment is allowed for dual-connectivity operation can be based on an indication obtained from the user equipment that the user equipment is dual-connectivity capable. In one instance, determining that the user equipment is allowed for dual-connectivity operation can be based on an indication provided by a policy server that indicates that the user equipment is allowed for dual-connectivity operation.

In one instance, the method may include advertising, by each radio unit of the plurality of radio units, an indication that the radio access network supports dual-connectivity operation.

In one instance, the method may include based on determining that the user equipment is allowed for dual-connectivity operation, causing the user equipment to connect to the mobile network via a second cell of the radio access network while the user equipment is connected via the first cell. In one instance, the first cell is a shared cell or a unique cell and the second cell is a shared cell or a unique cell that is different than the first cell.

In one instance, the user equipment establishes a protocol data unit (PDU) session for a particular application via the shared cell or a particular unique cell provided by a particular radio unit based on the policy. In one instance, the first cell is provided by the particular radio unit and the user equipment connects to the mobile network via a second cell of the particular radio unit to establish the PDU session for the particular application. In one instance, the user equipment concurrently has another PDU session for another application via the first cell provided by the particular radio unit. In one instance, the first cell is a shared cell or a unique cell and the second cell is a shared cell or a unique cell that is different than the first cell.

In one instance, the method may include, based on determining that the user equipment is allowed for dual-connectivity operation, causing the user equipment to connect to the mobile network via a second cell of the radio access network while the user equipment is connected via the first cell, wherein the first cell is a shared cell or a unique cell and the second cell is a shared cell or a unique cell that is different than the first cell. In one instance, the user equipment is connected to the first cell of the radio access network for a first PDU session associated with a first application identified in the policy and the user equipment is connected to the second cell of the radio access network for a second PDU session associated with a second application identified in the policy.

In one form, another computer-implemented method is performed that may include obtaining, by a UE, a policy in which the policy identifies, for each of one or more applications, one of a shared cell operating mode or a unique cell operating mode that the UE is to utilize for each of the one or more applications. The policy obtained by the UE may include an application identity for each of the one or more applications that is mapped to one of the shared cell operating mode or the unique cell operating mode. In one instance, the policy may be an enhanced UE Route Selection Policy (URSP).

In one instance, the method may include determining activation of a particular application for the UE. For example, the particular application may be started/opened/launched by a user of the UE, the particular application may initiate, on its own, a session with an application server (e.g., critical app server 152 or best effort app server 154), the particular application may be triggered to initiate/launch a session based on a triggering event (e.g., time of day, environmental event, etc.), combinations thereof, and/or the like. In one instance, the method may include identifying, based on the policy obtained by the UE, a shared cell operating mode or a unique cell operating mode to utilize for establishing a PDU session with the mobile network for the particular application. In one instance, the method may include establishing the PDU session for the application with the mobile network via a shared cell or a unique cell based on the shared cell operating mode or the unique cell operating mode identified from the policy obtained by the UE.

In summary, techniques herein may facilitate dual-connectivity support for one or more UEs in a hybrid cell vRAN architecture. In particular, techniques herein may facilitate dual active PDU sessions concurrently across different cell operating modes or types, such as a unique cell type and a shared cell type, in the hybrid cell vRAN architecture. The selection of a cell type (unique or shared) for a PDU session of a UE can be based on a policy, such as an enhanced UE Route Selection Policy (URSP) configured and provided to the UE that specifies, at least in part, the operating mode/cell type that is to be utilized to establish a PDU session for each of one or more applications. In various instances, applications can be identified in the policy based on application IDs, application types, and/or the like.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by a node of a mobile network via a first cell of a radio access network, a request for a user equipment to connect to the mobile network via a first radio frequency (RF) connection with the first cell, wherein the radio access network comprises a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units;
   determining, through authentication of the user equipment for connection to the mobile network, that the user equipment is allowed for dual-connectivity operation; and
   based on determining that the user equipment is allowed for dual-connectivity operation, providing a user equipment route selection policy (URSP) to the user equipment, wherein the URSP identifies, for each of a plurality of applications, one of a shared cell operating mode or a unique cell operating mode that the user equipment is to utilize for RF connections for each of the plurality of applications and the URSP is to enable the user equipment to establish a first session via the first RF connection utilizing the shared cell operating mode or the unique cell operating mode for operating a first application of the plurality of applications.

2. The method of claim 1, wherein determining that the user equipment is allowed for dual-connectivity operation is based on an indication that is obtained from the user equipment or that is obtained from a policy server from which the URSP is obtained in which the indication indicates that the user equipment is allowed for dual-connectivity operation.

3. The method of claim 1, further comprising:
   broadcasting, via an RF broadcast provided by each radio unit of the plurality of radio units, an indication that the radio access network supports dual-connectivity operation.

4. The method of claim 1, further comprising:
   based on determining that the user equipment is allowed for dual-connectivity operation, causing the user equipment to connect to the mobile network via a second RF connection with a second cell of the radio access network while the user equipment is concurrently connected via the first RF connection with the first cell.

5. The method of claim 4, wherein the first cell is a shared cell or a unique cell and the second cell is a shared cell or a unique cell that is different than the first cell.

6. The method of claim 1, wherein the user equipment establishes the first session for the first application of the plurality of applications via the shared cell or via a particular unique cell provided by a particular radio unit of the plurality of radio units based on the URSP.

7. The method of claim 6, wherein the first cell is provided by the particular radio unit of the plurality of radio units and the user equipment connects to the mobile network via a second RF connection with a second cell of the particular radio unit of the plurality of radio units to establish the first session for the first application of the plurality of applications.

8. The method of claim 7, wherein the user equipment concurrently has a second session for another a second application of the plurality of applications via the first RF connection with the first cell provided by the particular radio unit of the plurality of radio units.

9. The method of claim 7, wherein the first cell is a shared cell or a unique cell and the second cell is a shared cell or a unique cell that is different than the first cell.

10. One or more non-transitory computer readable storage media encoded with instructions that, when executed by a processor, cause the processor to perform operations, comprising:
    obtaining, by a node of a mobile network via a first cell of a radio access network, a request for a user equipment to connect to the mobile network via a first Radio Frequency (RF) connection with the first cell, wherein the radio access network comprises a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units;
    determining, through authentication of the user equipment for connection to the mobile network, that the user equipment is allowed for dual-connectivity operation; and
    based on determining that the user equipment is allowed for dual-connectivity operation, providing a user equipment route selection policy (URSP) to the user equipment, wherein the URSP identifies, for each of a plurality of applications, one of a shared cell operating mode or a unique cell operating mode that the user equipment is to utilize for RF connections for each of the plurality of applications and the URSP is to enable the user equipment to establish a first session via the first RF connection utilizing the shared cell operating mode or the unique cell operating mode for operating a first application of the plurality of applications.

11. The media of claim 10, wherein determining that the user equipment is allowed for dual-connectivity operation is based on an indication that is obtained from the user equipment or that is obtained from a policy server from which the URSP is obtained in which the indication indicates that the user equipment is allowed for dual-connectivity operation.

12. The media of claim 10, further comprising instructions that, when executed by the processor, cause the processor to perform further comprising:
    based on determining that the user equipment is allowed for dual-connectivity operation, causing the user equipment to connect to the mobile network via a second RF connection with a second cell of the radio access network while the user equipment is concurrently connected via the first RF connection with the first cell, wherein the first cell is a shared cell or a unique cell and the second cell is a shared cell or a unique cell that is different than the first cell.

13. The media of claim 12, wherein the user equipment is connected to the mobile network via the first RF connection with the first cell of the radio access network for the first session associated with the first application of the plurality of applications identified in the URSP and the user equipment is concurrently connected to the mobile network via the second RF connection with the second cell of the radio access network for a second session associated with a second application of the plurality of applications identified in the URSP.

14. An apparatus of a mobile network comprising:
at least one memory element for storing data; and
at least one processor for executing instructions associated with the data, wherein executing the instructions causes the apparatus to perform operations, comprising:
obtaining, by the apparatus of the mobile network via a first cell of a radio access network, a request for a user equipment to connect to the mobile network via a first Radio Frequency (RF) connection with the first cell, wherein the radio access network comprises a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units;
determining, through authentication of the user equipment for connection to the mobile network, that the user equipment is allowed for dual-connectivity operation; and
based on determining that the user equipment is allowed for dual-connectivity operation, providing a user equipment route selection policy (URSP) to the user equipment, wherein the URSP identifies, for each of a plurality of applications, one of a shared cell operating mode or a unique cell operating mode that the user equipment is to utilize for RF connections for each of the plurality of applications and the URSP is to enable the user equipment to establish a first session via the first RF connection utilizing the shared cell operating mode or the unique cell operating mode for operating a first application of the plurality of applications.

15. The apparatus of claim 14, wherein determining that the user equipment is allowed for dual-connectivity operation is based on an indication that is obtained from the user equipment or that is obtained from a policy server from which the URSP is obtained in which the indication indicates that the user equipment is allowed for dual-connectivity operation.

16. The apparatus of claim 14, further comprising instructions that, when executed by the processor, cause the processor to perform further comprising:
based on determining that the user equipment is allowed for dual-connectivity operation, causing the user equipment to connect to the mobile network via second RF connection with a second cell of the radio access network while the user equipment is concurrently connected via the first RF connection with the first cell, wherein the first cell is a shared cell or a unique cell and the second cell is a shared cell or a unique cell that is different than the first cell.

17. The apparatus of claim 16, wherein the user equipment is connected to the mobile network via the first RF connection with the first cell of the radio access network for the first session associated with the first application of the plurality of applications identified in the URSP and the user equipment is concurrently connected to the mobile network via the second RF connection with the second cell of the radio access network for a second session associated with a second application of the plurality of applications identified in the URSP.

18. The method of claim 4, wherein the user equipment connects to the mobile network via the second RF connection with the second cell prior to the user equipment establishing the first session via the first RF connection.

19. The method of claim 4, wherein the first cell and the second cell are provided by a particular radio unit of the plurality of radio units.

20. The method of claim 1, wherein if the first application is a non-business-critical application, the URSP identifies the unique cell operating mode for the user equipment for the first application or if the first application is a business-critical application, the URSP identifies the shared cell operating mode for the user equipment for the first application.

* * * * *

UNITED STATES PATENT AND TRADEMARK OFFICE
CERTIFICATE OF CORRECTION

PATENT NO. : 11,882,611 B2
APPLICATION NO. : 17/321929
DATED : January 23, 2024
INVENTOR(S) : Srinath Gundavelli et al.

It is certified that error appears in the above-identified patent and that said Letters Patent is hereby corrected as shown below:

In the Claims

Claim 8, Column 30, Line 14, please replace "a second session for another a second" with --a second session for a second--

Signed and Sealed this
Thirtieth Day of April, 2024

Katherine Kelly Vidal
*Director of the United States Patent and Trademark Office*